Feb. 21, 1967 F. W. LOOSCHEN ETAL 3,305,839

BUFFER SYSTEM

Filed March 22, 1963 5 Sheets-Sheet 1

INVENTORS.
FLOYD W. LOOSCHEN
RICHARD STANTON SHARP
BY
Christie, Parker & Hale
ATTORNEYS.

Feb. 21, 1967 F. W. LOOSCHEN ETAL 3,305,839

BUFFER SYSTEM

Filed March 22, 1963 5 Sheets-Sheet 2

BUFFER SYSTEM
Filed March 22, 1963
5 Sheets-Sheet 5
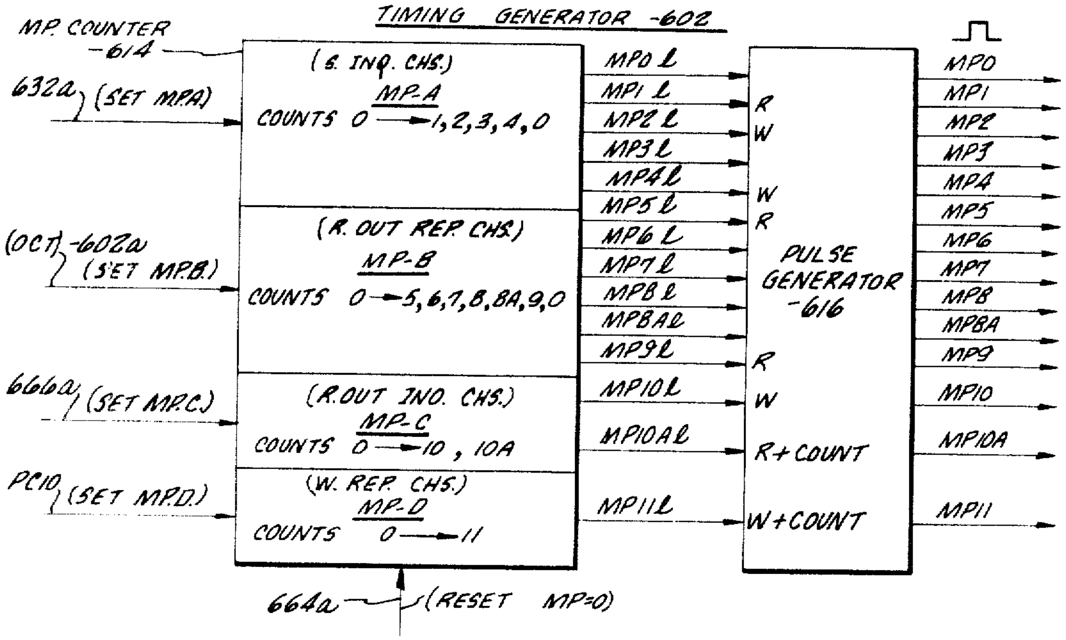
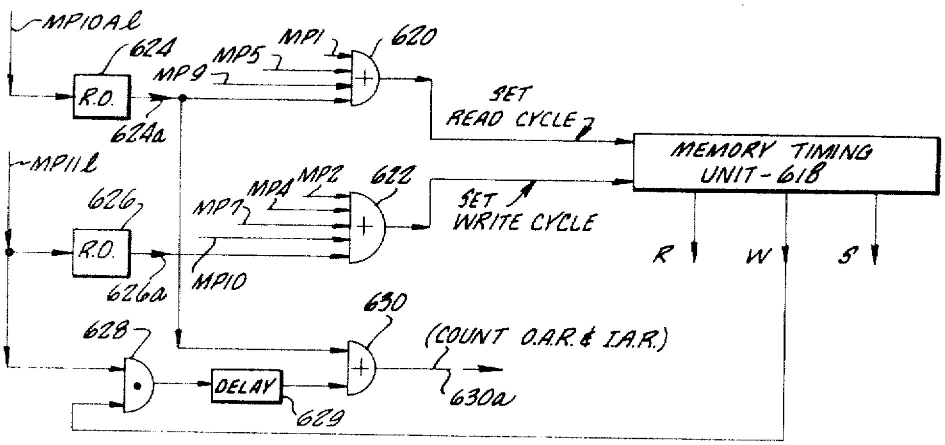
FIG. 3
FIG. 4
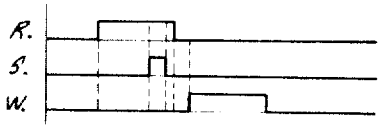
INVENTORS.
FLOYD W. LOOSCHEN
RICHARD STANTON SHARP
BY
Christie, Parker & Hale
ATTORNEYS.

3,305,839

BUFFER SYSTEM

Floyd W. Looschen, Arcadia, and Richard Stanton Sharp, Sierra Madre, Calif., assignors to Burroughs Corporation, Detroit, Mich., a corporation of Michigan Filed Mar. 22, 1963, Ser. No. 267,120
18 Claims. (Cl. 340—172.5)

This invention relates to electronic digital systems and, more particularly, to improvements in electronic inquiry systems for digital computers. A preferred embodiment of the present invention is contained in a typewriter inquiry system for a digital computer.

An important feature of the system described hereinafter lies in the overall system organization of the inquiry system. The system is organized such that simultaneous inquiry messages may be composed and sent to a digital computer completely independently of each other. The system contains a plurality of channels, each of which is arranged for sending a separate inquiry message to the computer. The messages sent through any channel are handled without delay due to inquiry messages being sent through other channels in the system.

A very important part of the overall system is the typwewriter inquiry subsystem. In the typewriter inquiry subsystem, each one of a plurality of typewriter units forms a series of electrical characters forming an inquiry message which is sent through a typewriter buffer and terminal device and other electronic circuits to a digital computer. The characters of the inquiry message formed by each typewriter unit may be completely independent and unsynchronized with the formation of characters by the other typewriter units. The typewriter buffer and terminal device is arranged for simultaneously buffering and handling messages composed by all of the typewriter units connected thereto.

The overall system is also arranged with a plurality of inquiry devices including telephone units and serial teletype nets. The telephone units, teletype nets and typewriter units may be independently controlled by operators for simultaneously forming inquiry messages for the digital computer. Under normal operating conditions, an operator forming an inquiry message for the computer at any one of the inquiry devices need not wait for the completion for an inquiry message by any other operator in the system.

Another important feature of the system lies in the typewriter buffer and terminal unit for the typewriter devices. The typewriter buffer and terminal unit sequentially scans the typewriter devices forming inquiry characters and stores the characters as they are formed and scanned into a common buffer device. A separate buffer section is provided for each typewriter device forming inquiry characters for the digital computer. The characters of an inquiry message from a typewriter device are sequentially stored in the corresponding one of the buffer sections. Also, a separate output buffer section is provided into which all of the characters of a reply message from the computer are sequentially stored before being transferred back to the typewriter unit forming the corresponding inquiry message.

Another important feature of the system lies in an arrangement in the typewriter buffer and terminal unit whereby the address of the next storage location into which a character is to be written is stored in a predetermined storage location in each buffer section of the buffer device. This arrangement allows significant reduction in cost for separate registers normally used for keeping track of the next storage location into which a character from each typewriter device is to be stored in the buffer device. Also of importance is the next address feature in combination with the scanning system allowing the next address feature to be integrated into the typewriter inquiry subsystem.

A further important feature is the use of an input designate counter which counts through a sequence of states corresponding to each typewriter inquiry device and the corresponding buffer sections of the buffer device. Compare and control circuitry are provided for causing the counter to count whenever an inquiry message character is formed and the input designate counter is not in a state corresponding to such typewriter device.

Also of importance is the provision of an output designate register which stores an indication of the typewriter device which is to receive a reply message after such typewriter device has formed a complete inquiry message for the computer. Routing circuitry is provided for coupling a reply message from the buffer device back to the typewriter device designated by the output designate register.

Briefly, a specific embodiment of the present invention comprises a reply device for receiving inquiry messages and for forming reply messages thereto, the messages being composed of a series of characters, a plurality of inquiry devices each arranged for forming a series of characters representing an inquiry message for the reply device and for receiving a reply message thereto, each reply device including means for forming a ready signal for each inquiry character formed thereby, buffer storage means including a separate buffer section for each inquiry device, counting means for counting through a sequence of states corresponding to each of the inquiry devices and a corresponding buffer section responsive to count signals, means for comparing the inquiry devices forming ready signals with the counting means including means for applying count signals to the counting means in the absence of equality therebetween, means coupled to be responsive to the detection of equality by the comparing means for storing the character formed by the inquiry device into the buffer section corresponding to the state of the counting means, output designating means including means for detecting the last character of a complete inquiry message stored into a buffer section and means for storing an indication of the inquiry device forming such character, means for reading a complete inquiry message out of a buffer section for the reply device and means for storing a reply message from the reply device into the buffer means, means for reading a reply message out of the buffer means, and selection means for coupling the characters of a reply message read out of the buffer means back to the inquiry device indicated by said output designating means.

Another specific embodiment of the present invention comprises first means and a plurality of second means for sending inquiry and reply messages therebetween, composed of characters, the second means including a plurality of independently operable devices, a control device including a plurality of terminal and buffer devices for temporarily storing the messages being sent between the first and second means including a prearranged terminal and buffer storage device for said plurality of independently operable devices, said prearranged terminal and buffer devices comprising a separate input storage area in the buffer storage device for each independently operable means and a separate output storage area in the buffer storage device, a scanning device for sequentially scanning the independently operable means in a prearranged order and for detecting the formation of an inquiry character thereby, means for sequentially storing the character from each detected independently operable means into the corresponding storage area in the buffer storage device, means for sequentially reading the characters of a stored message out of the buffer device for the second means, and means for sequentially storing the characters of a reply message from the second means into the output storage area of the buffer device including means for sequentially reading such reply message characters out of the output storage area and for coupling such characters back to the same independently operable device as formed the corresponding inquiry message.

A further embodiment of the present invention comprises means having a plurality of output circuits at each of which a message composed of a series of characters are applied for a receiving device, buffer means for storing messages being transferred between the message forming means and such receiving device including a separate buffer storage area for each output circuit having a stored address, means for sequentially scanning and detecting the output circuits receiving a message character and for forming a designation thereof and a corresponding buffer storage area, means for coupling the character received by the detected output circuit to the buffer means, means for reading the address out of the designated buffer section, and means for storing the message character coupled to the buffer means into a storage location of the designated buffer section corresponding to the address read out of the buffer means.

These and other aspects of the present invention may be more fully understood with reference to the following description of the drawings of which:

Figure 1:
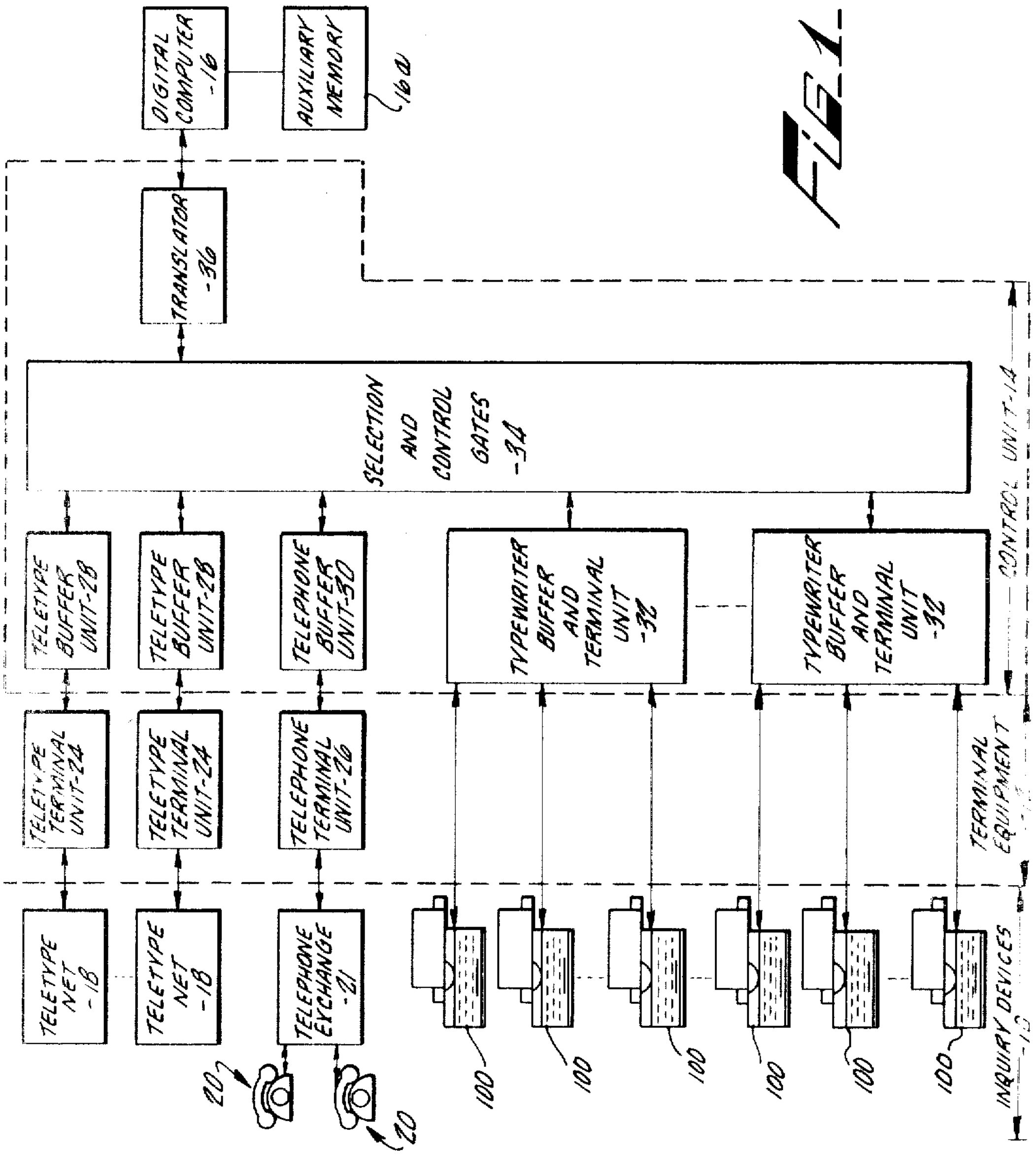
FIG. 1 shows a general block diagram of an inquiry system and embodying the present invention.
Figure 2:
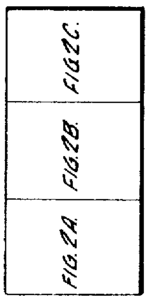
FIG. 2 shows a block diagram of the arrangement of FIGS. 2A, 2B and 2C.
Figure 2A:
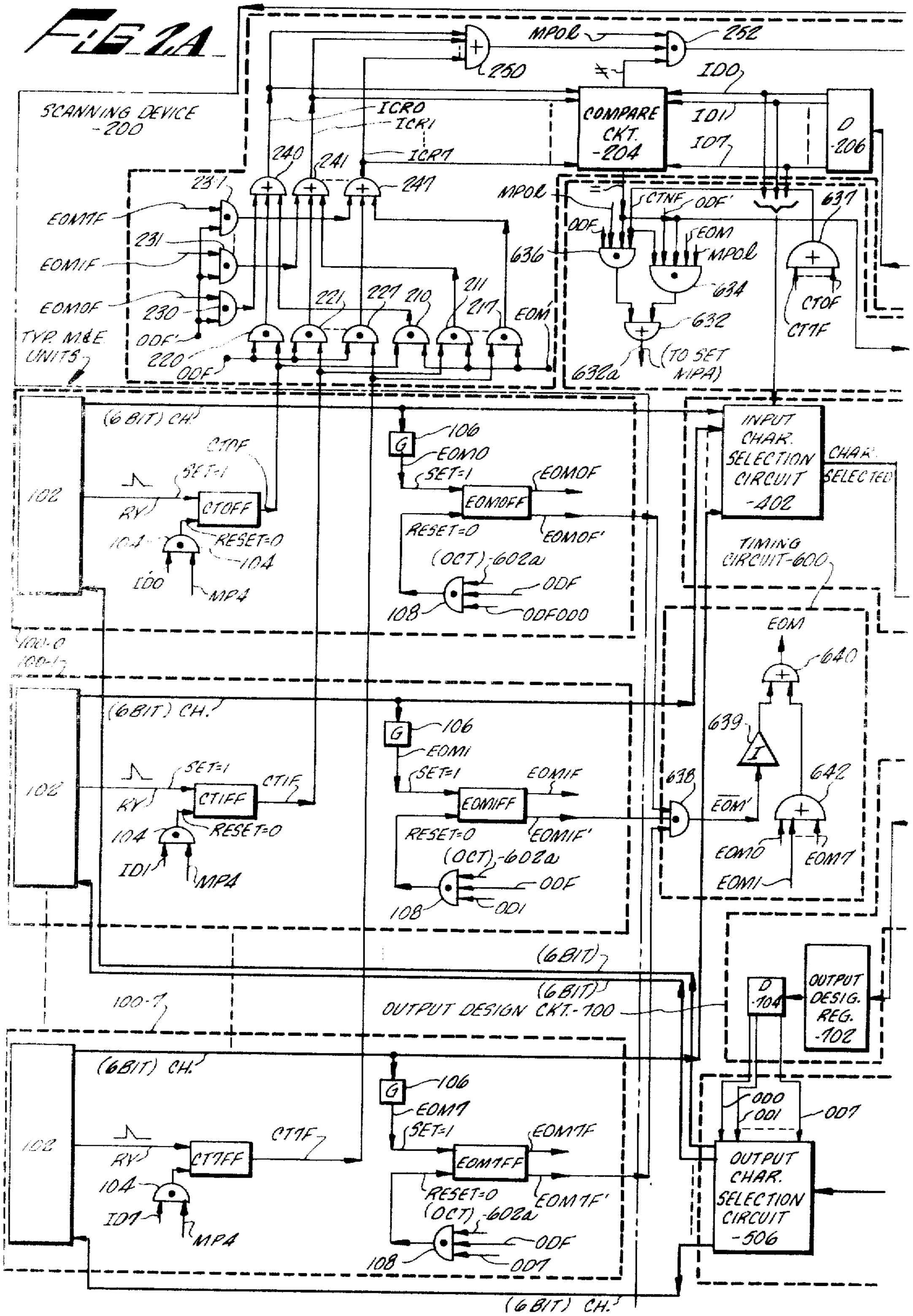
Figure 2B:
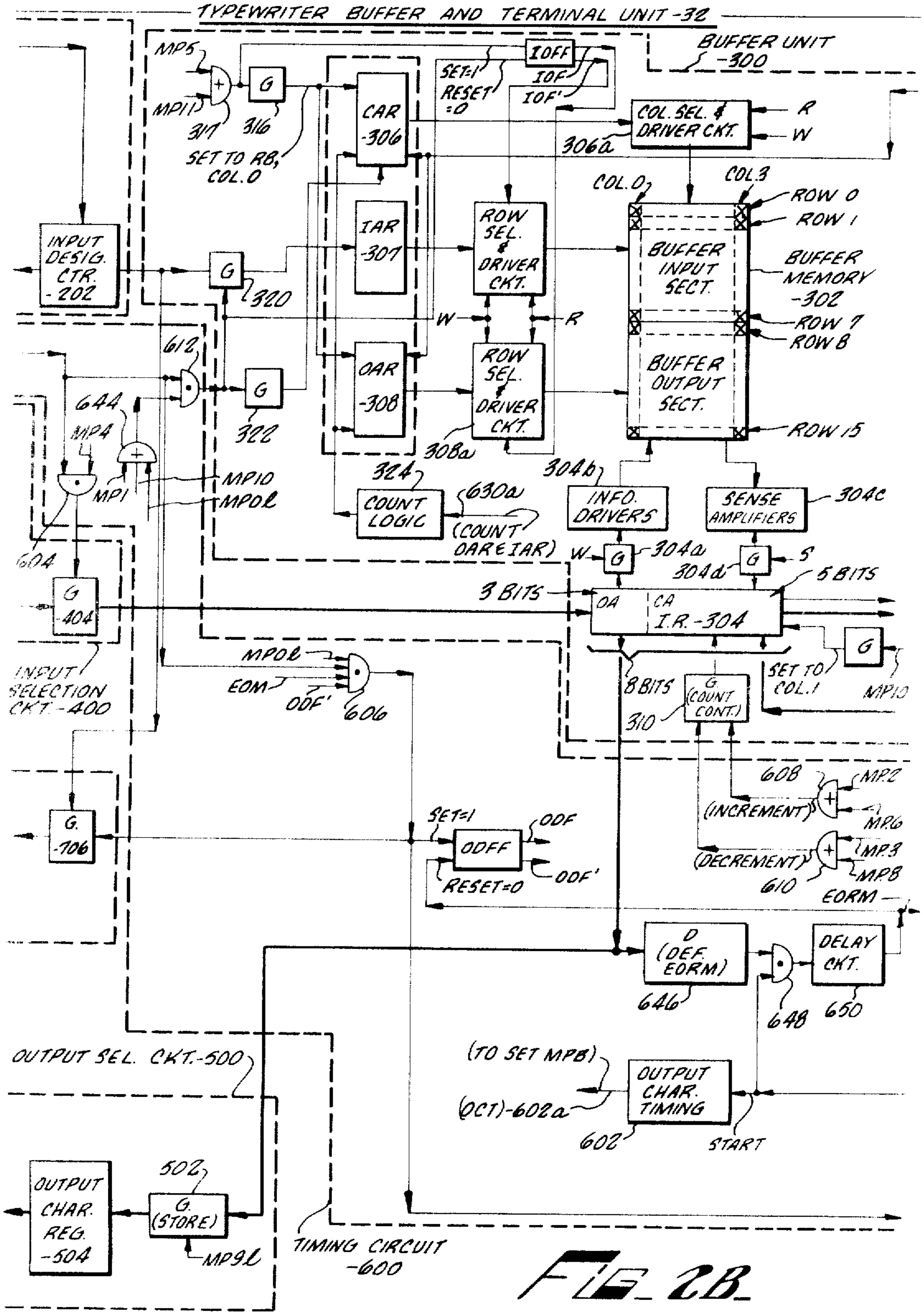
Figure 2C:
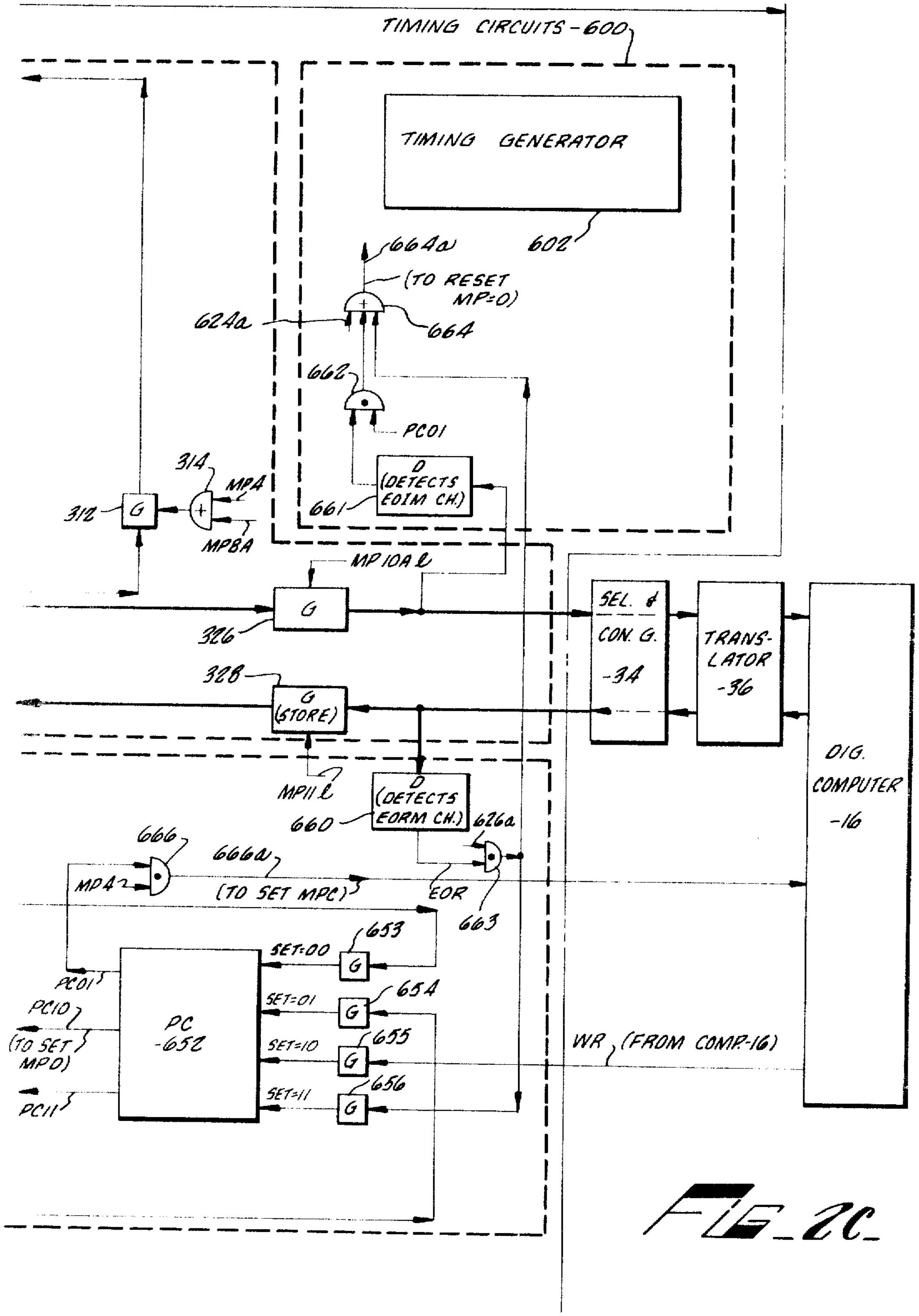

FIGS. 2A, 2B and 2C form a detailed block diagram of the typewriter inquiry subsystem for the inquiry system shown in FIG. 1, which embodies the present invention;

FIG. 3 shows a block diagram of the timing generator for the inquiry subsystem shown in the block diagram of FIG. 2C; and FIG. 4 shows a timing diagram illustrating the sequence with which the timing generator of FIG. 3 forms read, write and strobe pulses.

Refer now to the inquiry system shown in the block diagram of FIG. 1 and embodying the present invention. A plurality of inquiry devices 10 are provided for composing inquiry messages composed of a series of electrical character signals for a digital computer 16. The inquiry devices 10 are also arranged for receiving reply messages to the inquiry messages composed of a series of electrical character signals. The inquiry messages composed by the inquiry devices 10 are sent through terminal equipment 12 to a control unit 14 where the inquiry messages and reply messages as well, which are being sent between the inquiry devices and the computer 16, are temporarily stored. The inquiry messages are selectively read out of the control unit 14 for the digital computer 16. The digital computer 16 may be a conventional digital computer or data processor well known in the computer art for receiving inquiry messages requesting information stored in the memory and auxiliary memory 16*a* or a main memory (not shown) in the digital computer 16. The digital computer 16 is arranged in a well known manner in the computer art for reading information out of the auxiliary memory 16*a* or out of the main memory of the digital computer 16, which information comprises a reply message for the requesting inquiry device. Additionally, the digital computer is arranged for composing a reply message in answer to an inquiry message by processing data stored in the main memory of the computer 16 or the auxiliary memory 16*a*. A reply message composed in one of the aforementioned ways is then presented by the computer 16 to the control unit 14 in the form of a series of electrical character signals. The reply message is temporarily stored into the control unit 14 and subsequently read out and sent back through the corresponding terminal equipment 12 to the inquiry device which composed the inquiry message.

Refer now in particular to the inquiry devices 10. Inquiry devices 10 include a plurality of series teletype nets 18. The teletype nets 18 comprise a plurality of teletype stations (not shown) connected in the well known series net arrangement commonly used in teletype installations. Also included in the inquiry devices 10 are a plurality of telephone sets 20 and a telephone exchange 21. The telephone sets 20 are conventional telephone sets including a dialing unit with which inquiry messages may be composed consisting of a series of dialed character signals coded in the form of a series of pulses commonly used in the telephone art. The telephone sets 20 also include a receiver with which an operator audibly receives a reply message from the digital computer 16 in answer to an inquiry message. The telephone exchange 21 is a conventional telephone type of PABX for coupling one of the telephone sets through to the terminal equipment 12 in response to the dialing of a correct sequence of numbers at a telephone set.

Additionally included in the inquiry devices 10 are a plurality of typewriter sets 100. The teletype nets 18 and telephone units 20 compose characters which are characterized in form as serial by character, serial by bit. The terminal equipment 12 includes teletype terminal units 24 and a telephone terminal unit 26 for converting the signals formed by the telephone teletype nets 18 and telephone sets 20 into characters characterized in form as serial by character, parallel by bit. It should be noted that the typewriter units 100 compose messages characterized as serial by character, parallel by bit. Hence, terminal equipment as used for the telephone and teletype units for converting to parallel operation is not required therefor. However, it should be understood that the typewriter devices 100 could be arranged for forming characters characterized as serial by character and serial by bit, in which case the control unit 14 would be used to convert the characters to serial by character parallel by bit for the digital computer 16.

Refer now to the control unit 14. The inquiry messages composed at the inquiry stations are presented to the control unit 14 in the form of a series of characters. Buffer units are provided in the control unit 14 for temporarily storing the inquiry and reply messages being sent between the digital computer 16 and the inquiry devices 10. A teletype buffer unit 28 is provided for each teletype terminal unit 24. A telephone buffer unit 30 is provided for the telephone terminal unit 26. A plurality of buffer and terminal units 32 are provided, each of which receives inquiry messages from a plurality of the typewriter units 100. The control unit 14 includes selection and control gates 34 for sequentially scanning the buffer units in the control unit 14 and coupling buffer units containing a complete inquiry message to a translator 36. The buffer units are arranged for automatically reading a complete inquiry message out thereof for coupling to the translator 36.

The translator 36 is provided for translating the teletype and typewriter inquiry messages from the code used by the teletype and typewriter devices into a code used internally by the digital computer 16. The translator 36 is also arranged for translating the characters of reply messages formed by the digital computer 16 from computer code back to teletype and typewriter coded messages for the respective inquiry devices.

The digital computer 16 receives the inquiry messages a character at a time and forms the reply message thereto a character at a time which is sent back through the translator 36, the selection and control gates 34 and to one of the buffer units. The reply message is subsequently read out of such buffer unit and sent back to the same inquiry device which composed the corresponding inquiry message.

In the case of the typewriter units 100, type keys are provided along with electrical and mechanical mechanisms for composing inquiry messages, and a carriage, paper and a printing mechanism are provided for printing inquiry messages out which are being composed, and for printing out reply messages received by the typewriter unit for visual observation.

The invention is directed primarily to the typewriter inquiry subsystem consisting of the typewriter units 100, the typewriter buffer and terminal units 32, selection and control gates 34, the translator 36, the digital computer 16 and the auxiliary memory 16*a*. Claim is asserted to the general system organization in a copending application entiled "Inquiry System," filed in the name of Duncan N. MacDonald, bearing Serial No. 265,435, and filed on March 15, 1963, and assigned to the same assignee as the present invention. Claim is asserted to a voice encoding apparatus including the telephone terminal unit 26 in a copending patent application entitled "Voice Encoder," filed in the name of Frederick L. Fox, bearing Serial No. 265,776 and filed on March 18, 1963, now Patent No. 3,296,371, and assigned to the same assignee as the present invention. The patent application entitled "Inquiry System," filed in the name of Duncan N. MacDonald should be referred to for additional details of the inquiry system, other than the typewriter inquiry subsystem, and is hereby incorporated by reference.

*Typewriter inquiry subsystem—General description*

Refer now to the detailed block diagram of the typewriter inquiry subsystem shown in FIG. 2 composed of FIGS. 2A, 2B and 2C. Operators form inquiry messages at one of the typewriter inquiry stations, referenced in FIG. 2 by the symbols 100–0 through 100–7 to distinguish between eight typewriter units shown therein, by typing a series of characters representing the inquiry message. The characters are in the form of electrical signals and are characterized as serial by character parallel by bit.

A scanning device 200 is provided and contains an input designate counter 202 which counts through a series of states which corresponds to the typewriter units 100–0 through 100–7. A compare circuit 204 is provided in the scanning device 200. When the state of the input designate counter 202 corresponds to one of the typewriter units 100, which is simultaneously forming an inquiry character, the compare circuit 204 detects this condition and causes the input designate counter 202 to stop counting. The scanning device 200 and counter 202 then temporarily lock with the counter 202 in a state corresponding to such typewriter unit.

A buffer unit 300 is provided in the typewriter buffer and terminal unit 32 and contains a buffer memory 302. The buffer memory 302 contains a memory input section and a memory output section. The buffer input section contains eight separate buffer sections, one corresponding to each of the typewriter units 100–0 through 100–7. The eight input buffer sections are referenced by the symbols ROW 0 through ROW 8. Each of the buffer sections contains a predetermined storage location, referenced as being in a COL. 0, in which an address is stored designating the next storage location in the corresponding buffer section into which a character from the corresponding typewriter unit is to be stored. After the compare circuit 204 detects equality means, including column address register 306, an output address register 308, and an information register 304, read the next address contained in the predetermined storage location of the buffer section which corresponds to the state of the input designate counter 202. Means including the information register 304 and a count control circuit 310 increment the next address, and means including the registers 306 and 307 restores the incremented address back into the predetermined storage location of the same buffer section designated by the state of the input designate counter 202.

Input selection circuits 400 are provided and arranged for coupling the inquiry character formed by the typewriter unit corresponding to the state of the input designate counter 202 to the input circuit of the buffer unit 300. The next address read out of the buffer input section is stored in the column address register 306. Means including the column address register 306, the input address register 307 and the information register 304 stores the character coupled to the buffer unit 300 into the storage location of the buffer section designated by the next address contained in the column address register 306. This operation continues for each typewriter unit and corresponding buffer input section with the next address being incremented and restored for each new character, causing the characters from each typewriter unit to be sequentially stored in the corresponding buffer input section.

After an operator has composed a complete inquiry message at a typewriter unit, he types a special character designating that the message is complete. This special character is referred to as an end of message character (EOM). An output designating means, referred to as circuit 700, is arranged for storing a signal corresponding to the typewriter unit and the buffer section, designated by the input designate counter 202, when an end of message character (EOM) is formed. The output designate circuit 700 contains an output designate register 702 for storing a signal corresponding to the state of the input designate counter 202. The storage content of the output designate register 702 is retained for subsequent use in providing an indication to output selection circuits 500, of which typewriter unit 100 is to receive a reply message to the inquiry message which was just completed by an end of message character (EOM).

Means including the column address register 306 and input address register 307 is arranged for sequentially reading out the complete inquiry message contained in the buffer section designated by the state of the input designate counter 202 when an end of message character (EOM) is formed. The characters of the complete inquiry message is read out of the buffer unit 300 in the same order as they are stored and coupled through the selection and control gates 34 and the translator 36 to the digital computer 16. The digital computer 16 composes a reply message to the inquiry message and sends the reply message, a character at a time, back through the translator 36, the selection and control gates 34, to the buffer unit 300. Means including the column address register 306, the output address register 308 and the information register 304 store the characters of the reply message sequentially into the buffer output section of the buffer memory 302 in sequentially addressable storage locations. After the reply message is completely stored in the buffer output section, means including the column address register 306, the output address register 308 and the information register 304 reads the characters of the reply message back out of the buffer output section in the same sequence in which the characters of the reply message are stored and provides the characters of the message to the output selection circuit 500. The output selection circuit 500 couples the characters of reply message back to the typewriter unit which is designated by the content of the output designate register 702.

*Typewriter inquiry detailed description*

Before describing the circuits of FIG. 2 in detail, a symbol convention to be used throughout the following description will be described. Flip-flop, such as EOMIFF, are used in the circuits. The flip-flop itself is designated by FF (i.e., EOMIFF) following the symbol representing te flip-flop, whereas a single F (i.e., EOMIFF) is used to designate the output circuits thereof. The flip-flops have two output circuits, one of which is primed and one of which is unprimed (i.e., EOMIF and EOMIF'). The unprimed output circuit receives a control signal when the corresponding flip-flop is in a one state, whereas a control signal is applied at the unprimed output circuit when the flip-flop is in a zero state. FIG. 2 has been prepared using heavy lines, in contrast with the other thin lines, showing the signal lines which carry the characters of the messages transferred into and out of the buffer unit 380 from and to the typewriter units and the computer 16.

TYPEWRITER UNITS 100

The typewriter units 100 are conventional units such as that identified by the teletype company as Model 33. Each typewriter unit 100 contains a conventional typewriter mechanical and electrical character forming and receiving unit 102. This is a conventional unit in a typewriter unit of the above described type, including keyboard type bars, switches, electrical circuits, etc. for forming a signal representative of a character each time one of the keys is depressed by an operator. The signals representing a character are applied at an output circuit represented by the symbol CH. The character of signals applied at the output circuit CH are characterized in form as parallel by bit. Also, each time a key on the keyboard of the typewriter unit is struck and a character of signals is formed at the output circuit CH, a conventional electrical circuit added in the unit 102 (not shown) applies a short pulse at an output circuit referenced by the symbol RY. A character timing flip-flop circuit is provided in each of the typewriter units 100–0 through 100–7 for providing an indication of when the corresponding typewriter unit is forming a character for storage in the buffer unit 300 until such character is completely read from the typewriter unit by the buffer unit 300.

The character timing flip-flop circuits in the typewriter units 100–0 through 100–7 are referenced by the symbols CT0FF through CT7FF, respectively. The RY output circuit of the typewriter mechanical and electrical character forming and receiving units 102 is connected to the set=1 input of the character timing flip-flops in each of the typewriter units. A ready signal applied at the RY output circuit triggers the CTFF flip-flop in the corresponding typewriter unit into a one state.

An AND gate 104 is provided in each of the typewriter units 100 for resetting the CTFF flip-flops in the corresponding typewriter unit into a zero state. Each of the AND gates 104 has an input connected to an output circuit MP4 (see FIG. 3) of a timing generator 602 in the timing circuits 600 (see FIG. 3). Also, each of the AND gates 104 has an input circuit connected to an output circuit of a decoder 206 provided in the scanning device 200. The decoder circuit 206 has eight output circuits referenced by the symbols ID0 through ID7. The ID0 output circuits of the decoder 206 is connected to the AND gate 104 in the typewriter unit 100–0. The ID1 output circuit of the decoder 206 is connected to the input circuit of the AND gate 104 of the typewriter unit 100–1, etc. An output signal is applied at the output circuit ID0 through ID7 of the decoder circuit 206 corresponding to the typewriter units 100–0 through 100–7 which is designated by the input designate counter 202. For example, when the input designate counter 202 is in state zero, thereby designating the typewriter unit 100–0 as the unit forming a character for storage in the buffer unit 300, an output signal is applied at the ID0 output circuit of the decoder 206; when the input designate counter 202 is in state one designating the typewriter unit 100–1, the decoder circuit 206 forms an output signal at the output circuit ID1; etc. To be explained in detail, when a control signal is applied at the MP4 output circuit of the timing generator 602, the character at the designated typewriter unit has been read by the buffer unit 300, and, hence, the character timing flip-flop in such typewriter unit may be triggered into a zero state. To this end, the AND gate 104 resets the CTFF flip-flop in the typewriter unit designated by the output signal of the decoder 206 and the state of the input designate counter 202 into a zero state in response to the control signal at the MP4 output circuit.

Also provided in each typewriter unit 100–0 through 100–7 is an end of message flip-flop. The end of message flip-flops in the typewriter units 100–0 through 100–7 are referenced by the symbols EOM1FF through EOM7FF. The end of message flip-flops are provided for storing an indication that an end of message character has been formed by the corresponding typewriter unit. To this end, a gate 106 is provided in each of the typewriter units 100–0 through 100–7 for detecting an end of message character and for setting the end of message flip-flop (in the corresponding typewriter unit) into a one state whenever an end of message character is applied to the output circuit CH.

The end of message flip-flop in the typewriter units 100–0 through 100–7 designated by the state of the input designate counter 202 is to be reset into a zero state after an output designate flip-flop (referenced by the symbol ODFF) provided in the timing circuit 600 is set into a one state. To this end, an AND gating circuit 108 is provided in each of the typewriter units 100–0 through 100–7 for resetting the end of message flip-flop in the corresponding typewriter unit into a zero state. The AND gating circuit 108 in each of the typewriter units has two input circuits connected to the (OCT)–602*a* output circuit of an output character timing unit 602 in a timing circuit 600 and the ODF output circuit of the ODFF flip-flop. A third input circuit of the AND gating circuits 108 is connected to output circuits of a decoder circuit 704 provided in the output designate circuit 700.

The decoder circuit 704 has seven output circuits referenced by the symbols OD0 through OD7 corresponding to the typewriter units 100–0 through 100–7, respectively. An output signal is applied to the output circuit corresponding to the typewriter unit which is designated by the content of the output designate register 702. For example, if the output designate register 702 stores a signal designating typewriter unit 100–0, a control signal is applied at the OD0 output circuit. The AND gating circuits 108 in the typewriter units 100–0 through 100–7 have input circuits connected to the output circuits OD0 through OD7, respectively.

Refer now to the scanning device 200.

SCANNING DEVICE 200

The scanning device 200 contains three sets of AND gating circuits 210 through 217, 220 through 227, and 230 through 237. Each of the AND gating circuits 210 through 217 has an input circuit connected to the output circuit referenced by the symbol EOM'. To be explained in detail in a subsequent description of the timing circuit 600, the output circuit EOM' is the output of an AND gating circuit 638 in the timing circuit 600 which receives a control signal if an end of message character has not been formed by a typewriter unit. Also, each of the input circuits of the AND gating circuits 220 through 227 has an input circuit connected to the output circuit of the ODFF flip flop in the timing circuit 600. Each of the AND gating circuits 230 through 237 has an input circuit connected to the ODF' output circuit of the ODFF flip-flop. In addition, the AND gating circuits 220 through 227 have an input circuit connected to the output circuit of the character timing flip-flops CT0FF through CT7FF, respectively. Similarly, the AND gating circuits 210 through 217 have an input circuit connected to the output circuit of the character timing flip-flops CT0FF through CT7FF, respectively. The AND gating circuits 230 through 237 have input circuits connected to the output circuits EOM0F through EOM7F of the end of message flip-flops provided in the typewriter units 100–0 through 100–7, respectively. The output circuits of the AND gating circuits 210, 220 and 230 are connected to the input circuit of the OR gating circuit 240; the output circuit of the AND gating circuits 211, 221 and 231 are connected to the input circuit of the OR gating circuit 241; etc. The output circuits of the OR gating circuits 240 through 247 are connected to an OR gating circuit 250.

An AND gating circuit 252 is provided and has three input circuits which are connected to the MP0*l* output circuit of the timing generator 602 (see FIG. 3), the ≠ output circuit of the compare circuit 204 and the output circuit of the OR gating circuit 250.

The output circuits of the OR gating circuits 240 through 247 are referenced by the symbols ICR0 through ICR7 corresponding to the typewriter units 100–0 through 100–7, respectively. As pointed out hereinabove, the decoder circuit 206 has eight output circuits referenced by the symbols ID0 through ID7 at which a control signal is applied at one of the output circuits which is representative of the state of the input designate counter 202. Each state of the input designate counter 202 and the corresponding output circuit of the decoder circuit 206 which receives a control signal corresponds to one of the typewriter units 100–0 through 100–7.

The compare circuit 204 is a conventional electronic diode comparing circuit which compares the output signal of the decoder circuit 206 with the output circuit ICR0 through ICR7 and provides the control signal at the = output circuit whenever the control signal is applied at both the ICR0 and ID0 output circuits, or both the ICR1 and ID1 output circuits or both the ICR7 and ID7 output circuits. In the absence of equality, a control signal is applied at the ≠ output circuit of the compare circuit 204.

Thus, the scanning device 200 operates as follows: Whenever a typewriter unit 100–0 through 100–7 forms an inquiry character, the corresponding character timing flip-flop forms a control signal at its output circuit which is applied to the input circuits of the gating circuits 220 through 227 and 210 through 217. Assuming that an end of message character has not been formed by any of the typewriter units, a control signal is applied at the EOM′ output circuit; however, no control signal is applied at the ODF output circuit of the ODFF flip-flop. Hence, the gating circuit 210 through 217 corresponding to the tyypewriter unit forming the inquiry character applies a control signal to the corresponding OR gating circuit 240 through 247 which in turn applies a control signal to the OR gating circuit 250 causing a control signal at the input circuit of the AND gating circuit 252. Assuming that the input designate counter 202 is in a state other than that corresponding to the typewriter unit forming the inquiry character, the compare circuit 204 applies a control signal at its ≠ output circuit. Assuming that a control signal is applied at the MP0 output circuit, the AND gating circuit 252 applies a control signal to the input circuit of the counter 202. The input designate counter 202 is responsive to the control signal from the AND gating circuit 252 to start counting through a sequence of states corresponding to the typewriter units 100–0 through 100–7 in sequence until the compare circuit 204 detects that the state of the input designate counter 202 corresponds to the typewriter unit forming the inquiry character. The compare circuit 204 then forms a control signal at the = output circuit and removes the control signal from the ≠ output circuit causing the input designate counter 202 to stop counting.

INPUT SELECTION CIRCUITS 400

The input character selection circuits 400 contain an input character selection circuit 402 and a gate 404. The input character selection circuit 402 is a conventional diode electronic selection circuit for coupling the character of signals applied at the CH output circuit of one of the typewriter units 100–0 through 100–7 to the input circuit of the gate 404. The typewriter unit 100–0 through 100–7 forming a character which is coupled to the input of the gate 404 depends on the state of the input designate counter 202 and the output circuit of the decoder 206 receiving a control signal. To this end, the input character selection circuit 402 is arranged for coupling the CH output circuit of the typewriter unit 100–0 through 100–7 to the input of the gate 404 which corresponds to the output circuit of the decoder 206 receiving a control signal.

The gate 404 is a conventional diode electronic gating circuit for coupling output signals from the input character selection circuit 402 to the input of the buffer unit 302 and for storing the signals into a column address section of the information register 304, in response to a control signal applied at the output circuit of an AND gating circuit 604.

OUTPUT DESIGNATE CIRCUIT 700

The output designate circuit 700 contains the output designate register 702, the decoder 704 and a gate 706. The output designate register 702 is a conventional flip-flop register containing three flip-flops capable of assuming eight different states corresponding to the eight different typewriter units 100–0 through 100–7.

The decoder circuit 704 is a conventional electronic decoding circuit for forming a control signal at one of the output circuits OD0 through OD7 corresponding to one of the eight states of the output designate register 702. The gate 706 is a conventional diode gating circuit for storing the content of the input designate counter 202 into the output designate register 702 in response to a control signal from a gate 606 provided in the timing circuit 600.

OUTPUT SELECTION CIRCUITS 500

The output selection circuit 500 is provided for coupling the characters of a reply message from the buffer unit 300 back to the typewriter unit forming the corresponding inquiry message. The output selection circuit 500 contains a gate 502. The gate 502 is responsive to a control signal applied at the MP9*l* output circuit of the timing generator 602 (see FIG. 3) for storing the content of column address portion of the information register 304 into the output character register 504. The output character selection circuit 506 couples the character of signals contained in the output character register 504 to the input circuit of the typewriter station 100–0 through 100–7 designated by the content of the output designate register 702 and the output signal of the decoder 704.

BUFFER UNIT 300

The buffer memory 302 is a coincident current type of magnetic core buffer memory device arranged in rows and columns. The buffer memory 302 contains 32 columns referenced by the symbol COL. 0 through COL. 1. There are 16 rows in the buffer memory 302 referenced by the symbols ROW 0 through ROW 15. The buffer input section includes ROW 0 through ROW 7. The buffer output section includes ROW 8 through ROW 15. At the intersection of each row and column is a storage location in the buffer memory unit 302 for storing eight binary coded bits of information. Six of the eight bits of storage are for storing the six bit characters from the typewriter units. ROW 0 through ROW 7 of the buffer input section are for storing the characters of the inquiry messages formed by the typewriter stations 100–0 to 100–7, respectively. An inquiry message from a typewriter station is limited to 31 characters of information by the thirty-two columns less one column for the predetermined storage location for storing the next address. The storage location at the intersection of COL. 0 and each of the rows contained in the buffer input section is the predetermined storage location for storing the next address of the corresponding buffer section into which an input character is to be stored. Similarly, the intersection of COL. 0 and ROW 8 of the buffer output section is a storage location for storing the next address of the buffer output section out of which a character is to be read from the buffer output section.

The buffer unit 300 also contains the column address register (CAR) 306, the input address register (IAR) 307, and the output address register (OAR) 308. The column address register 306 is a conventional register composed of five flip-flops for storing a five bit binary coded address designating one of COL. 0 through COL. 31 in the buffer memory 302. The input address register 307 is also a conventional register composed of three flip-flops for storing a three bit binary coded address designating one of ROW 0 through ROW 7 of the buffer input section.

The output address register 308 is also a conventional register composed of three flip-flops arranged for storing three bits of a binary coded address designating one of ROW 8 through ROW 15 in the buffer output section.

Column selection and driver circuit 306*a*, row selection and driver circuits 307*a* and 308*a* are provided and are conventional coincident current selection and driving circuits which cooperate with the buffer memory 302 for providing read and write address selection signals to one of the storage locations in the buffer memory 302 for reading and writing eight bits of information therein. The column and selection driver circuit 306*a* applies one-half of the required coincident current addressing signals to the column designated by the content of the column address register 306. One of the row selection and driver circuits 307*a* and 308*a* applies the other one-half of the required coincident current addressing signals to the row designated by the input address register 307 and output address register 308, respectively.

The row selection and driver circuits 307*a* and 308*a* have input circuits connected to the output circuits IOF' and IOF, respectively, of an input-output control flip-flop IOFF. Also, circuits 307*a* and 308*a* have input circuits connected to both R and W output circuits of the timing generator 602 (see FIG. 3). The row selection and driver circuits 307*a* and 308*a* are arranged for providing coincident current read and write signals in response to control signals at the R and W output circuits in coincidence with control signals at the IOF' and IOF output circuits, respectively.

The information register 304 is a conventional flip-flop register for storing eight bits of binary coded information. A gate 304*a* and an information driver circuit 304*b* are provided and are conventional gating and core driving circuits which provide inhibit signals, in a conventional coincident current core memory fashion, corresponding to the eight bits of information contained in the information register 304. This causes the storage location selected by the column address register 306 and either the input or output address registers 307 or 308 to be written and store the content of the information register 304. The gate 304*a* is a conventional gate arranged to apply the content of the information register 304 to the information driver 304*b* in response to a control signal at the W output circuit of the timing generator 602 (see FIG. 3). Also, a sense amplifier circuit 804*c* and a gate 304*d* are provided for amplifying and storing the signals, read out of the addressed storage location of the buffer memory 302, into the information register 304 in a conventional fashion whenever a control signal is applied at the S output circuit of the timing generator 602 (see FIG. 3).

A count logic circuit 324 is provided in the buffer unit 300 and is arranged in response to a control signal applied at the 630*a* output circuit of the timing generator 602 (see FIG. 3) for counting the address contained in the column address register 306 up by one address. When the state of the column address register 306 designates COL. 31, the following control signal applied to the count logic 124 causes it to recycle and cause the content of the column address register to designate COL. 0. The count logic 124 is also arranged for counting the content of the output address register 308 up one address whenever the content of the column address register 306 recycles from COL. 31 to COL. 0. To be explained in detail, column address register 306 will only be counted from COL. 31 to COL. 0 when information is being stored into the buffer output section of the buffer memory 302.

Refer now specifically to the information register 304. The information register 304 is broken down into two sections, one of which contains storage for three bits of information and the other section containing storage for five bits of information. The next address which is stored in COL. 0 of the buffer input section of the buffer memory 302 contains five bits designating one of COL. 1 through COL. 31, whereas the three bits are zeroes. When the next address is read out of one of the buffer input sections of the buffer memory 302, zeroes are stored in the three bit output address section of the information register 304 and the address of the correct column is stored in the column address section of the information register 304. The next address contained in the buffer output section of the memory 302 contains five bits designating one of COL. 0 through COL. 31 and three bits designating one of ROW 7 through ROW 15 of the buffer output section, and are stored into the column address and output address sections, respectively, of the information register 304.

A gate count control circuit 310 is provided for counting up the content of the information register 304. An increment control input circuit of the gate 310 is connected to the output of an OR gating circuit 608, provided in the timing circuit 600. A decrement control input circuit of the gate count control circuit 310 is connected to the output circuit of an OR gating circuit 610 in the timing circuit 600. Whenever a control pulse is applied at the increment control input of the gate count control circuit 310, the address contained in the column address section is counted up by one address. Similarly, whenever a control signal is applied at the decrement input control circuit of the gate count control circuit 310, the address contained in the column address section of the information register 304 is counted down by one address. Similar to the count logic circuit 324, whenever the address contained in the column address section of the information register 304 designates COL. 31 and is reset to designate COL. 0, the content of the output address section of the information register 304 is counted up by one row address. This column address is only counted from COL. 31 to COL. 0 when it is the next address read out of the buffer output section.

Gate 312 is provided in the buffer unit 300 for storing the content of the information register 304 into the column address register 306 and the output address register 308. The content of the column address section of the information register 304 is stored into the column address register 306 whereas the content of the output address section is stored into the output address register 308. The gate 312 stores the content of the information register 304 into the registers 306 and 308 in response to a control signal at the output circuit of an AND gating circuit 314. The AND gating circuit 314 has two input circuits connected to the MP4 and MP8A output circuits of the timing generator 602 (see FIG. 3).

A gate 311 is provided for setting the content of the information register 304 such that the addresses contained in the column address section designates COL. 1 in the input buffer section. To be explained in detail in the subsequent description of operation, this is done so that the COL. 1 address may be stored into the column address register 306 for use in addressing the buffer memory 302.

A gate 316 is provided for resetting the content of the column address register 306 and the output address register 308 to designate COL. 0, ROW 8 (the predetermined storage location of the buffer output section which contains the next address). Gate 316 resets the registers 306 and 308 in response to a control signal applied at the output circuit of an OR gating circuit 317. The OR gating circuit 317 has its input circuits connected to the output circuits MP5 and MP11 of the timing generator 602 (see FIG. 3).

A gating circuit 320 is provided for storing the content of the input designate counter 202 into the input address register 307 in response to a control signal applied at the output circuit of an AND gating circuit 612 provided in the timing circuit 600. Also, a gate 322 is provided in the buffer unit 300 for resetting the content of the column address register 306 so that it designates COL. 0. Gate 322 resets the content of the column address register 306 in response to a control signal applied at the output circuit of the AND gating circuit 612.

Also provided in the buffer unit 300 is a gating circuit 326 which couples the content of the information register 304 to the input of the selection and control gates 34 in response to a control signal applied at the MP10A*l* output circuit of the timing generator 602 (see FIG. 3). A gating circuit 328 is provided in the buffer unit 300 for storing a character of signals provided by the selection and control gates 34 to the buffer unit 300, into the information registers 304 in response to a control signal applied at the MP11*l* output circuit of the timing generator 602 (see FIG. 3).

It should be noted that characters provided by the typewriter units and the digital computer 16 are six bit characters, and that the information register 304 contains storage for eight bits of information. Eight bits are required for the information register 304 in order to store the five bits necessary for the column address register 306 and the three bits required for the output address register 308. Thus, information is written and read in the buffer memory 302 eight binary coded bits at a time. To this end, the gate 404 is arranged for storing the six bit character from the typewriter unit into only a predetermined six bits of the information register 304 and for resetting the rest of the bits in the information register 304 to zeroes. The information read out of the buffer memory 302 (other than the next address for the buffer output section) and stored in the information register 304 also contains zeroes for storage in all but the predetermined six bits. Also the gate 328 is arranged for storing the six bit characters from the digital computer 16 into the predetermined six bits of the information register 304. The gate 326 is arranged for coupling six bit characters contained in the predetermined six bits of the information register 304 out to the selection and control gate 34 for the digital computer 16.

The arrangement of the information register 304 into eight bits is described herein for purposes of simplifying the explanation of the invention. However, it should be noted that the invention may also be arranged such that two characters are read out of the buffer memory 302 each time information is read or written therein and the information register 304 arranged for storing only six bits rather than eight. Thus, one of the two characters for each memory access could be used for providing one character for the column address and three bits of the other character used for the output address for the rows in the buffer output section.

TIMING CIRCUIT 600

Refer now to FIG. 3. FIG. 3 shows a block diagram of the timing generator 602 of the timing circuit 600. The timing generator 602 contains a memory phase counter 614 and a pulse generator 616. The memory phase counter 614 is arranged for counting through four different sequences of operations. The sequences are referred to herein as memory phase A, memory phase B, memory phase C and memory phase D. The memory phase counter 614 contains gating and counters for causing the different phases of operation and has output circuits at which control signals are applied for each state of operation of the memory phase counter 614.

The memory phase counter 614 is set into memory phase A in response to a control signal applied at the 632*a* input circuit by a gating circuit 632 (see timing circuit 600 FIG. 2A). Normally, the memory phase counter 614 is in a state zero, being set there in response to a control signal applied at the reset MP=0 input which is connected to the 664*a* output circuit of a gating circuit 664 (see timing circuit 600, FIG. 2C). A control signal applied at the 632*a* input circuit of the memory phase counter 614 causes the memory phase counter 614 to count from state 0 into state 1 and count sequentially through states 1, 2, 3 and 4 and then back to state 0. Similarly, a control signal applied at the (OCT)–602*a* output circuit of the output character timing circuit 602 (see timing circuit 600, FIG. 2B) causes the memory phase counter 614 to step into memory phase B during which memory phase counter 614 counts from state 0 into state 5 and sequentially count through states 5, 6, 7, 8, 8A and 9 and then back to state 0.

A control signal applied at the 66*a* out put circuit of the gating circuit 666 (see timing circuit 600, FIG. 2C) causes the memory phase counter 614 to enter memory phase C. During memory phase C, the memory phase counter 614 counts from state 0 into state 10 and then into state 10A where the memory phase counter 614 remains until a control signal is applied at the reset MP=0 input circuit thereof by the gate 664. A control signal applied at the PC10 output circuit of a program counter 652 causes the memory phase counter 614 to count from state 0 into state 11 where the memory phase counter remains until a reset signal is applied to the input circuit reset MP=0 by the gate 664.

During each of the states of the memory phase counter 614 a control signal is continuously applied at one of the output circuits thereof. The output circuit at which a control signal is applied is referenced by a letter corresponding to the state of the memory phase counter 614 preceded by MP and followed by the letter *l*. Thus during state zero, a control signal is applied at the MP0*l* output circuit of the memory phase counter 614.

The pulse generator 616 is connected to the output circuits of the memory phase counter 614 and is arranged for forming a short control pulse in response to the relatively longer output signal formed during each of the states of the memory phase counter 614. For example, during state 0 of the memory phase counter 614, a control signal is applied at the MP0*l* output circuit. At the beginning of the state 0 of the memory phase counter 614 when the control signal is first applied at the MP0*l* output circuit, a short control pulse is applied at the MP0 output circuit of the pulse generator 616. The output circuits of the pulse generator 616 at which a control pulse is applied for the corresponding control signal from the memory phase counter 614 are numbered similar to the output circuits of the memory phase counter 614 except that the small letter *l* is omitted therefrom.

Also included in the timing generator 602 is a memory timing unit 618 which forms a read signal at the R output circuit, a write signal at the W output circuit, and a strobe signal at the S output circuit. The memory timing unit 618 has two basic cycles of operation, one of which is referred to as a read cycle and the other of which is referred to as a write cycle.

Refer now to FIG. 4 wherein a wave shaped diagram is shown which illustrates the sequence of operation of the memory timing unit 618. Whenever the memory timing unit 618 receives a control signal from the output circuit of an OR gating circuit 620, the memory timing unit goes through a read cycle wherein a read pulse is applied at the R output circuit followed by a write pulse applied at the W output circuit. In coincidence with the read pulse, a strobe pulse is applied at the S output circuit. The read pulse causes the content of the addressed location of the buffer memory 302 to be read out and the strobe pulse causes the gate 304*d* (see FIG. 2B) to store the information read out of the buffer memory 302 into the information register 304. The subsequent write pulse applied at the W output circuit causes the information stored in the information register 304 to be rewritten back into the same memory location from which the information was read. Thus, the information read out of the buffer memory unit 302 is restored.

Thus, the buffer memory 302 and associated memory control circuits in cooperation with the memory timing unit 618 form a conventional coincident current memory system commonly used in digital computers. For a discussion of such memory systems, see the discussion in chapter 7 of the book entitled "Digital Computer Fundamentals" written by Thomas C. Bartee and published by the McGraw-Hill Book Company, Inc. of New York in 1960.

Whenever, an OR gating circuit 622 applies a control signal to the memory timing unit 618, the memory timing unit goes through a write cycle. During the write cycle of operation, the memory timing unit 618 forms a read pulse at the R output circuit following by a write pulse at the W output circuit. However, a strobe pulse is not formed at the S output circuit. Hence, the information read out of the buffer memory 302 due to the read pulse is not stored into the information register 304. The read pulse at the R output circuit clears the previous information contained in the addressed storage location and the following write pulse at the W output circuit causes the information contained in the information register 304 to be written into the addressed storage location.

The OR gating circuit 620 has five input circuits connected to the output circuits MP1, MP5, MP9 and the output circuit 624*a* of a relaxation oscillator 624. The OR gating circuit 622 has four input circuits connected to the output circuits MP2, MP4, MP7 and the output circuit 626*a* of a relaxation oscillator 626. The relaxation oscillators 624 and 626 are conventional relaxation oscillator circuits which form a series of control pulses in response to a control signal applied at their input circuits. The input circuit of relaxation oscillators 624 and 626 are connected to the output circuits MP10A*l* and MP11*l*, respectively, of the memory phase counter 614.

An OR gating circuit 630 is provided for forming control signals for the count logic 324 (see buffer unit 300, FIG. 2B). The OR gating circuit 630 has two input circuits connected to the output circuits of a delay circuit 629 and the relaxation oscillator 624. The delay circuit 629 has its input circuit connected to the output of an AND gating circuit 628. The AND gating circuit 628 has its input circuits connected to the output circuits MP11*l* of the memory phase counter 614 and a W output circuit of the memory timing unit 618. Thus, each time a control pulse is formed by the relaxation oscillator 624, a count signal is applied at the output of the OR gating circuit 630. Similarly, whenever a control signal is applied at the MP11*l* output circuit and a control pulse is formed at the W output circuit of the memory timing unit 618, the AND gating circuit 628 causes the OR gating circuit 630 to form a count control signal at the output circuit thereof. However, it should be noted that the delay circuit 629 has a sufficient internal delay between the formation of a write pulse at the W output circuit of the memory timing circuit 618 that the information contained in the information register 304 is completely stored prior to the time a control pulse is applied to the gating circuit 630 thereby. This allows a complete write operation before the address contained in the registers 306 and 308 is counted up by the count logic control circuit 324 (see FIG. 2B) in response to the control signal from the gating circuit 630.

Refer now to the timing circuit 600 shown in FIGS. 2A, 2B and 2C. The OR gate 632 forms a control signal which sets the memory phase counter 614 (see FIG. 3) into memory phase A. The OR gate 632 has its input circuit connected to the output circuits of AND gating circuits 634 and 636. The input circuit of the gating circuit 636 is connected to the output circuit ODF, MP0*l* (timing generator 602, FIG. 3) and CTNF (gating circuit 637) and the = output circuit of the compare circuit 204. The AND gating circuit 634 has its input circuits next to the output circuits ODF′, EOM (see gate 640, FIG. 2A), MP0*l* (see memory phase counter 614, (FIG. 3) and the = output circuit of the compare circuit 204.

The OR gating circuit 637 is provided for forming a control signal at the CTNF output circuit. The OR gating circuit 637 has input circuits connected to the CT0F through CT7F output circuits of the character timing flip-flops in the typewriter units 100–0 through 100–7.

The AND gating circuit 604 has two input circuits connected to the = output circuit of the compare circuit 204 and the MP4 output circuit (timing generator 602, FIG. 3). The OR gating circuit 638 is provided in the timing circuit 600 for forming a control signal at the EOM′ output circuit. The OR gating circuit 638 has its input circuit connected to the output circuits EOM0F′ through EOM7F′ of the end of message flip-flops in the typewriter units 100–0 through 100–7. Thus, only when all of the end of message flip-flops are in a zero state is a control signal applied at the EOM′ output circuit of the gating circuit 638. The EOM′ output circuit is connected through a signal inverter circuit 639 to the input of an OR gating circuit 640. The OR gating circuit 640 has another input circuit connected to an OR gating circuit 642. The OR gating circuit 642 has its input circuits connected to the output circuits EOM0 through EOM7 of the gates 106 in the typewriter stations 100–0 through 100–7. Thus, the OR gating circuit 640 forms a control signal at the output circuit EOM whenever a control signal is not applied at the EOM′ output circuit and a control signal is applied at any one of the output circuits EOM0 through EOM7. Thus, a control signal is applied at the EOM output circuit whenever an end of message character is detected by one of the gating circuits 106 in the typewriter units 100–0 through 100–7. Then after the end of message flip-flop in the corresponding type writer unit is set into a one state, the unprimed output circuit thereof forms a control signal which causes the OR gating circuit 642 to apply a control signal through the OR gating circuit 642 to the EOM output circuit until the end of message flip-flop is reset into a zero state.

The OR gating circuit 608 has its input circuits connected to the output circuits MP2 and MP6. The OR gating circuit 610 has its input circuits connected to the output circuits MP3 and MP8.

The AND gating circuit 612 is the one which applies a control signal to the gates 320 and 322 in the buffer unit 300. The AND gating circuit 612 has input circuits connected to the = output circuit of the compare circuit 204 and an OR gating circuit 644. The OR gating circuit 644 has its input circuits connected to the output circuits MP1, MP0*l* and MP10 (see timing generator 602, FIG. 3).

The gating circuit 606 is provided for forming a control signal for the gate 706 in the output designate circuits 700 and for the ODFF flip-flop. The AND gating circuit 606 has input circuits connected to the output circuits MP0*l* (see timing generator 602, FIG. 3), EOM (FIG. 2A), and ODF′ and the = output circuit of the compare circuit 204.

A detector circuit 646 is provided for detecting when an end of reply message character is stored in the information register 304. The detector circuit 646 is arranged for applying a control signal to the input of an AND gating circuit 648 whenever an end of reply message character is detected as being stored in the information register 304. The AND gating circuit 648 has another input circuit connected to the output circuit PC11 of the program counter 652. A delay circuit 650 is connected to the output of the AND gating circuit 648 and applies a control signal at the EORM output circuit thereof after a predetermined time delay following the application of a control signal thereto by the AND gating circuit 648. The delay provided in the delay circuit 650 is sufficient that the end of reply character stored in the information register 304 is shifted through the output character register 504 and printed out by the typewriter unit receiving the corresponding reply message before the pulse is formed at the output of the delay circuit 650.

The ODFF flip-flop has its set=1 input circuit connected to the AND gate 606. The reset=0 input of the ODFF flip-flop is connected to the output circuit of the delay circuit 650.

The program counter 652 has four unique states of operation referred to as states 00, 01, 10, and 11, and corresponding to the latter three states, output circuits are provided and referenced by the symbols PC01, PC10, and PC11. Normally, the program counter is in states 00. A gate 653 is provided for triggering the program counter 652 into state 00. The gate 653 has its control circuit connected to the output circuit of the delay circuit 650. A gate 654 is provided for triggering the program counter 652 into state 01. The gate 654 has its control circuit connected to the output of the gating circuit 606. A gate 655 is provided for triggering the program counter into state 10. The gate 655 has its control circuit connected to the WR output circuit of the digital computer 16. A gate 656 is provided for triggering the program counter 652 into state 11. The control circuit of the gate 656 is connected to the output circuit of a detector circuit 660.

A detector circuit 660 is connected to the output circuit of the selection and control gate 34 which is connected to the gate 328. Whenever the detector circuit 660 detects an end of reply message character, a control signal is applied at the EOR output circuit thereof.

An AND gating circuit 663 has its input circuits connected to the output circuit EOR and the 626*a* output circuit (see timing generator 602, FIG. 3), and has its output circuit connected to gating circuit 664. Thus, gating circuit 663 applies a control signal to the gating circuit 664 after an end of reply message character is received by the buffer unit 300 and is completely written therein, responsive to the subsequently occurring pulse from the relaxation oscillator 626.

The output character timing generator 602 is a conventional timing generator which forms a series of output pulses in response to a control signal applied at the input circuit thereof by the PC11 output circuit of the program counter 652. The output character timing generator 602 is arranged for forming a control signal at the (OCT)-602*a* output circuit thereof when a control signal is first applied at the PC11 output circuit, and for forming a series of output pulses following such output pulse spaced apart by the time required for a typewriter unit to receive a character from the output character register 504 and print the character.

The detector circuit 661 is provided for detecting an end of inquiry message character being applied to the selection and control gates 34 by the gate 326. The detector circuit 661 is responsive to an end of inquiry message character for applying a control signal to an AND gating circuit 662. The AND gating circuit 662 has other input circuits connected to the PC01 output circuit and the 624*a* output circuit (see timing generator 600, FIG. 3). The OR gating circuit 664 has its input circuit connected to the output circuit of the gating circuit 662 and the output circuit of the detector circuit 660. The gating circuit 664 has an output circuit 664*a* which provides the control signal to the reset input of the memory phase counter 614 (see FIG. 3).

The AND gating circuit 666 has an output circuit 666*a* for providing control signals to the input circuits of the memory phase counter 614 for causing it to step into memory phase C. The AND gating circuit 666 has an input circuit connected to the output circuits MP4 (timing generator 602, FIG. 3) and the PC01 output circuit of the program counter 652.

The digital computer 16 is responsive to a control signal applied at the PC01 output circuit of the program counter 652 for conditioning itself for the receipt of an inquiry message from the buffer unit 300. The digital computer 16 receives the inquiry message a character at a time as translated by the translator 36. After the digital computer has composed a reply message to the inquiry message, it forms a control signal at the WR output circuit thereof causing the gate 655 to trigger the program counter 652 into state 10. Subsequently, the digital computer 16 starts providing a series of characters forming the reply message to the gate 328. Each time a character is provided to the gate 328, the character is stored into the formation register 304. The computer 16 is synchronized with the operation of the memory timing unit 618 by means of gating and timing circuits well known in the computer art but which are not shown herein so that as soon as the write plus is formed and a character is in the information register 304 and is stored into the buffer memory 302, another character is provided to the gate 328 for storage into the information register 304. The characters of the reply message are provided by the digital computer 16 in rapid succession in this manner so that a complete reply message may be stored in a buffer memory 302 before losing any information from typewriter units forming inquiry characters for the digital computer.

*Typewriter inquiry subsystem—Example of operation*

Assume initially that the typewriter inquiry subsystem shown in FIGS. 2A, 2B and 2C is in a static condition and that none of the typewriter units have formed an inquiry character for the digital computer 16, that the end of message flip-flops in each of the typewriter units and the character timing flip-flops in each of the typewriter units are in a zero state causing the gating circuit 638 to form a control signal at the EOM′ output circuit. Also, assume that the input designate counter 202 is in a state corresponding to the last typewriter unit forming an inquiry character for the digital computer 16 and is not counting.

Assume now that the typewriter unit 100–7 forms an inquiry character for the digital computer 16. The six bit coded character is applied at the CH output circuit thereof and a short ready pulse is applied at the RY output circuit causing the CT7FF flip-flop to be set into a one state. The output signal of the CT7FF flip-flop is applied to the input circuits of the gating circuits 227 and 217. The gating circuits 210 through 217 also receive a control signal from the EOM′ output circuit. This causes the gating circuit 217 to apply a control signal to the OR gating circuit 247 which in turn applies a control signal to the input of the OR gating circuit 250. The OR gating circuit 250 in turn applies a control signal to the input of the AND gating circuit 252.

Initially, the memory phase counter 614 (FIG. 3) forms a control signal at the M0*pl* output circuit. Also, assume that the input designate counter 202 is in a state corresponding to the typewriter unit 100–0. Thus, a control signal is applied at the ID0 output circuit of the decoder 206. This causes the compare circuit 204 to form a control signal at the ≠ output circuit and the gating circuit 252 applies a control signal to the count input of the input designate counter 202.

The input designate counter 202 starts counting in response to the control signal applied at its count input circuit until the input designate counter 202 is in a state corresponding to the typewriter unit 100–7. The decoder 206 then forms a control at the ID7 output circuit and the compare circuit 204 detects equality between the control signal at the ICR7 output circuit and the ID7 output circuit and removes the control signal from the ≠ output circuit causing the gating circuit 252 to remove the control signal from the count input of the input designate counter 202. The compare circuit 204 also forms a control signal at the = output circuit and since the ODFF flip-flop is initially in a zero state, the gating circuit 634 applies a control signal through the OR gating circuit 632 to the 632*a* output circuit thereof. This causes a control to be applied to the memory phase counter 614 setting it into memory phase A (see FIG. 3). During memory phase A, the memory phase counter 614 counts from state 0 through states 1, 2, 3, 4 and back to 0.

Thus, it should now be evident that the scanning device 200 including the counter 202 scan the typewriter units when an inquiry character is formed until the state of the counter 202 corresponds to a typewriter unit forming an inquiry character whereupon a locking means including the gating circuit 252 and the control therefor, comprising the memory phase counter 614 (see FIG. 3) which forms the control signal at the output circuit MP0*l*, temporarily locks the scanning device 200 until the character is read by the buffer unit 300, and the control signal is again applied at the MP0*l* output circuit.

The control pulse at the MP1 output circuit causes the gating circuits 644 and 612 to apply a control signal to the gates 320 and 322. This causes the gate 320 to store the content of the input designate counter 202 to the information address register 307 and causes the gate 322 to reset the column address register 306 to designate COL. 0. Thus, the input address register 307 now contains the address of ROW 7 which corresponds to the typewriter unit 100-7 which is forming the inquiry character and the column address register 306 which contains the address of COL. 0. Therefore, the address register 306 and 307 form the address of the predetermined storage location in buffer section for ROW 7 in which the next address is stored.

The gating circuit 612 also applies a control signal to reset=0 input of the IOFF flip-flop causing it to be set into a zero state. Thus, the ROW selection and driver circuit 307*a* receives a control signal from the output circuit IOF' and will be used (instead of the circuit 308*a*) for addressing the buffer input section of the buffer memory 302, during the subsequent operations.

The control pulse at the MP1 output circuit also causes the gating circuit 620 to apply a control signal to the memory timing unit 618 causing it to go through a read cycle (see FIG. 3). During the read pulse formed at the R output circuit, the next address contained in the predetermined storage location of ROW 7 is read out and the strobe pulse at the S output causes the gate 304*d* to store the next address into the information register 304.

The conrol pulse at the MP2 output circuits causes the gating circuit 608 to apply a control signal to the increment input control of the gate 310. This causes the gate 310 to increment the next address contained in the information register 304 so that it forms the address of the next subsequent next address for storage back into the predetermined storage location of ROW 7.

Referring again to FIG. 3, the control pulse at the MP2 output circuit causes the gating circuit 622 to apply a control signal to the memory timing unit 618 causing a write cycle. Since the address registers 306 and 307 still contain the same address, the write pulse causes the gate 304*a* and information driver 304*b* to store the incremented next address back into ROW 7, COL. 0.

The control signal at the MP3 output circuit causes the gating circuit 610 to apply a decrement control signal to the gate 310. This causes the gate 310 to decrement the address contained in the information register 304 by one address as pointed out hereinabove. As explained in detail hereinabove, actually, only the column address portion of the address contained in the information register 304 is decremented.

The control signal at the MP4 output circuit causes the gating circuit 314 to apply a control signal to the gate 312 causing it to store the address contained in the information register 304 into the registers 306 and 308. As pointed out hereinabove, the address contained in the output address section of the information register 304 is zero, therefore, the content of the output address register 308 remains unchanged, whereas the next address read from ROW 7, COL. 0 is stored in the column address register 306.

Referring again to FIG. 3, the control signal at the MP4 output circuit also causes the gating circuit 622 to apply a control signal to the memory timing unit 618 causing another write cycle. Also the control signal at the MP4 output circuit causes the gating circuit 604 to apply a control signal to the gate 404 causing the character applied thereto by the input character selection circuit 402 to be stored in the information register 304. As pointed out hereinabove, the decoder circuit 206 applies a control signal to the input character selection circuit 402 at the output circuit ID7. This causes the input character selection circuit 402 to couple the character applied at the CH output circuit of the typewriter unit 100–7 to the gate 404. Thus, the character formed by the typewriter station 100–7 is stored into the column address section of the information register 304. The write cycle formed by the memory timing unit 618 (FIG. 3) causes the character contained in the information register 304 to be written into the next address of the buffer section of ROW 7 as determined by the address contained in the column address register 306.

The control pulse at the MP4 output circuit also performs another function. Referring to typewriter unit 100–7, the MP4 output circuit causes a control pulse to be applied at the input of the gating circuit 104 and since the decoder 206 is forming a control signal at the ID7 output circuit, the gating circuit 104 applies a reset signal to the CT7FF flip-flop causing it to be reset into a zero state.

Memory phase counter 614 now counts back to state 0, the scanning device receives a control signal at the MP0*l* output circuit again and is thereby unlocked, and the typewriter inquiry subsystem is ready for another inquiry character. This operation is repeated for each character formed by the typewriter units 100–0 through 100–7 until a complete inquiry message is stored in one of the rows of the buffer input section of the buffer memory 302.

Assuming that a complete message is stored in ROW 7 in the buffer input section of buffer memory 302, the operator of the typewriter unit 100–7 hits a key causing an end of inquiry message character to be applied at the CH output circuit thereof. The CT7FF flip-flop thereof is set into a one state as described hereinabove. Also, since this is an end of inquiry message character, the gate 106 of typewriter unit 100–7 forms a control signal at the EOM7 output circuit thereof. The control signal at the EOM7 output circuit causes the corresponding end of message flip-flop EOM7FF to be triggered into a one state and remove the control signal applied at the EOM7' output circuit. The gating circuit 642 also receives a control signal from the EOM7 output circuit causing the gating circuit 642 to immediately apply a control signal to the gating circuit 640. This causes the gating circuit 640 to immediately apply a control signal to the EOM output circuit. With the control signal removed from EOM7' output circuit (the input of the signal inverter circuit 639), the signal inverter circuit 639 also applies a control signal to the gating circuit 640. Thus, even if the signals are removed from the CH output circuit, the EOM7FF flip-flop will maintain the control signal at the output circuit EOM via the circuits 638, 639, and 640. The control signal at the EOM output circuit causes the gating circuit 606 to apply a control signal to the set=1 input of the ODFF flip-flop causing it to be triggered into a one state.

The gating circuits 230 through 237 initially receive the control signal applied at the ODF' output circuit. Also, after the ODFF flip-flop is set into a one state, the gating circuits 200 through 227 receive the control signal from the ODF output circuit. Thus, the control signal applied at the output circuit CT7F of the CT7FF flip-flop or EOM7F output circuit of the EOM7FF flip-flop causes either or both of the gating circuits 227 or the gating circuit 237 to apply a control signal through gating circuits 247 and 250 to the gating circuit 252. Thus, the input designate counter 202 counts until it corresponds to the state of the typewriter unit 100–7 forming the end of inquiry message character and a control signal is formed at the = equal output circuit of the compare circuit 204 and the control signal removed from the ≠ output circuit thereof.

The operation of the inquiry system of FIGS. 2A, 2B and 2C is identical in the case of an end of inquiry message character as for any other inquiry character. That is, the end of message character is brought into the information register 304 and stored in the next column address of ROW 7 as specified by the next address contained in ROW 7, COL. 0.

The control signal formed at the output circuit of the gate 606 also causes the gate 654 to trigger the program counter 652 into state 01 wherein a control signal is formed at the PC01 output circuit. The control signal formed at the MP4 output circuit during memory phase A, together with the control signal at the output circuit PC01, causes the gating circuit 666 to form a control signal at the 666*a* output circuit which signals the digital computer 16 that an inquiry message is ready to be sent to the computer. The control signal at the 666*a* output circuit also causes the memory phase counter 614 to count into memory phase C and the memory phase counter 614 counts from state 0 into the states 10 and 10A.

The control pulse at the MP10 output circuit causes the gating circuit 612 to apply a control signal to the gate 322 which resets the column address register 306 so that it now contains the address of COL. 0. The input address register 307 still contains the address of ROW 7. The control pulse at the MP10 output circuit also causes the gate 311 to set the address of COL. 1 into the column address section of the information register 304. The control signal at the MP10 output circuit additionally causes the gating circuit 622 to apply a control signal to the memory timing unit 618, causing it to go through a write cycle (see FIG. 3). The write cycle of the memory timing unit 618 causes the address of COL. 1 contained in the information register 304 to be written into the storage location ROW 7, COL. 0.

The control signal at the MP10*l* output circuit causes the relaxation oscillator 624 to form a series of control pulses (see FIG. 3). The control pulses at the output circuit of the oscillator 624 in turn causes the gating circuit 620 to apply a series of control pulses to the memory timing unit 618 causing it to go through a series of read cycles. Each control pulse applied at the output of the oscillator 624 causes the gating circuit 630 to apply a control signal to the 630*a* output circuit. Thus, the first pulse formed at the output of the oscillator 624 causes a control signal at the output circuit 630*a*, which in turn causes the count logic 324 to count the address contained in the column address register 306 up by one address from COL. 0 to COL. 1. The same pulse formed by the relaxation oscillator 624 causes the gating circuit 620 to apply a control signal to the memory timing unit 618. However, the address contained in the column address register 306 is incremented immediately before the read pulse is formed. Therefore, the following read cycle of the unit 618 causes the content of COL. 1, ROW 7 of the buffer input section in the memory 302 to be read out, stored in the information register 304 and coupled through gate 326, through the selection and control gate 34, through the translator 26 to the digital computer 16.

This operation is repeated for each pulse formed by the relaxation oscillator 624 causing the complete inquiry message stored in ROW 7 to be read out sequentially in the same order in which the message was stored.

Assume now that the end of inquiry message character is read out of the buffer memory 302 and stored in the information register 304. The detector circuit 661 detects that the end of inquiry message character is stored in the information register 304 and applies a control signal to the gating circuit 662. The control signal to the gating circuit 662 in combination with the relaxation oscillator pulse at the 624*a* output circuit and the control signal at the PC01 output circuit causes the gating circuit 662 to apply a control signal through the gating circuit 664 to the output circuit 664*a*. The control signal applied to the output circuit 664*a* causes a reset signal to be applied to the memory phase counter 614 causing the memory phase counter 614 to be reset from state 10A to state 0. Thus, the end of inquiry message character stored in the information register 304 is coupled through gate 326, the selection and control gates 34 and the translator 36 to the digital computer 16 and the memory phase counter 614 is reset to state 0. With the memory phase counter 614 back in state 0, the inquiry system is then free to receive other inquiry characters from the typewrite units 100–0 through 100–7.

After the digital computer 16 has composed a reply message to the inquiry message, it forms a control signal at the WR output circuit causing the gate 655 to set the program counter 652 into state 10. With the program counter 652 in state 10, a control signal is applied at the PC10 output circuit.

Referring to FIG. 3, the control signal at the PC10 output circuit causes the memory phase counter 614 to be set into memory phase D whenever the reply characters from the computer 16 are written in the buffer memory 302. The control signal formed at the MP11 output circuit causes gating circuit 317 to apply a control signal to the gate 316 which resets the column address register 306 and the output address register 308 such that they now designate ROW 8, COL. 0. As pointed out hereinabove, the ROW 8, COL. 0 storage location is the predetermined storage location in the buffer output section in which the next address for the buffer output section is stored. Also, the control signal formed by the gating circuit 317 sets the IOFF flip-flop into state one, causing it to apply a control signal at the IOF output circuit for the row selection and driver circuit 308*a*. Thus, during the following operation, the address contained in the output address register 308 will be used to address the buffer output section.

The control signal applied at the MP11*l* output circuit is applied to gate 328 and the reply characters from the digital computer 16 are stored into the information register 304.

Also, the control signal at the MP11*l* output circuit causes the relaxation oscillator 626 to start applying control pulses to the gate 622 (see FIG. 3). Thus, the control pulses applied to the gating circuit 622 causes control pulses to be applied to the memory timing unit 618 causing it to go through a write cycle for each control pulse. Each time the memory timing unit 618 forms a write pulse at the W output circuit, gating circuit 628 applies a control signal to the gating circuit 630 causing a count control signal to be applied to the output circuit 630*a*. Thus, the characters of the reply message formed by the digital computer 16 are stored into the information register 304 and subsequently stored into the storage location of the buffer output section of the memory 302 specified by the content of the column address register 306 and the output address register 308. The count signal applied at the output circuit 630*a* in coincidence with the write signal applied at the W output circuit of the memory timing unit 618 causes the count logic 324 to count the address contained in the column address register 306 up one address after each character is stored in the buffer output section of the memory 302. Thus, the characters of the reply message are stored in sequential storage locations in the buffer output section of the memory 302.

It should be noted that the first character of a reply message provided digital computer 16 is the address of the ROW 8, COL. 1, storage location of the buffer output section in the memory 302. To be explained in detail, the address now stored in the ROW 8, COL. 1, storage location is for use in reading the first-reply character which is to be read for the typewriter unit 100–7.

The digital computer 16 continues providing the reply characters for storage in the buffer output section of the memory 302 until the last character of the reply message is formed. After the last character of the reply message is formed, an end of reply message character is formed and provided for storage in the buffer output section similar to the other characters of the reply message. The detector circuit 660 detects the end of reply message character and forms a control signal at the output circuit EOR. The control signal at the output circuit EOR is gated with the next relaxation oscillator pulse at the output circuit 626 by the gating circuit 663 and causes the gating circuit 656 to set the program counter 652 into state 11 wherein a control signal is formed at the PC11 output circuit thereof. The control signal from gating circuit 663 also causes a control signal at the input of the gating circuit 664 causing a control signal at the output circuit 664*a*. The control signal applied at the output circuit 664*a* causes the memory phase counter 214 to be reset into state 0. The control signal formed at the PC11 output circuit causes the output character timing circuit 602 to form a control signal at the (OCT)–602*a* output circuit which triggers the memory phase counter 614*a* from state 0 into memory phase B.

Control signals are formed at the OD7, ODF and (OCT)–602*a* output circuits causing the gating circuit 108 to retrigger the EOM7FF flip-flop into a zero state.

During memory phase B, the memory phase counter 614 counts from state 0 through states 5, 6, 7, 8, 8A, 9 and back to 0. The control signal at the MP5 output circuit causes the gating circuit 317 to apply a control signal to the gate 316 which resets the column address register 306 and the output address register 308 so that the address of the ROW 8, COL. 0, storage location is designated. Also, the control signal formed by the gating circuit 317 triggers the IOFF flip-flop into a one state so that the row selection and driver circuit 308*a* will use the output address register 308 for addressing the buffer output section of the buffer memory 302. The control signal at the MP5 output circuit also causes the gating circuit 620 to apply a control signal to the memory timing unit 618 causing it to go through a read cycle (see FIG. 3). During the read cycle, the next address contained in the ROW 8, COL. 0, storage location is addressed and the next address contained therein is read out and stored in the information register 304.

A control signal formed at the MP6 output circuit causes the gating circuit 608 to apply an increment control signal to the gate count control circuit 310 which causes the next address contained in the information register 304 to be increased by one address. The control signal at the MP7 output circuit causes the gating circuit 622 to apply a control signal to the input circuit of the memory timing unit 618 causing it to go through a write cycle (see FIG. 3). The write cycle of the memory timing unit 618 causes the incremented next address contained in the information register 304 to be restored back into the ROW 8, COL. 0, storage location which is still designated by address registers 306 and 308.

The control signal formed at the MP8 output circuit causes the gating circuit 610 to apply a decrement control signal to the gate count control circuit 310. The gate count control circuit 310 in turn decrements the incremented address contained in the information register 304 so that it now again becomes the address of the next storage location out of which a character is to be read from the buffer output section of the memory 302.

The control signal at the MP8A output circuit causes the gating circuit 314 to apply a control signal to the gate 312 causing the next address (ROW 8, COL. 1) contained in the information register 304 to be stored into the column address register 306 and the output address register 308.

The control signal formed at the MP9 output circuit causes the gating circuit 620 to apply a control signal to the memory timing unit 618 causing it to go through a read cycle (see FIG. 3). During the read cycle, the character of the reply message contained in the address (ROW 8, COL. 1) specified by the column address register 306 and the output address register 308 is read out and stored into the information register 304. The control signal at the MP9/ output circuits causes the gate 502 to store the reply character contained in the information register 304 into the output character register 504.

The output designate register 702 still contains a designation of the typewriter unit 100–7. Thus, a control signal is formed at the OD7 output circuit of the decoder 704. This causes the output character selection circuit 506 to couple the character of the reply message contained in the output character register 504 back to the typewriter unit 100–7 which formed the corresponding inquiry message.

After entering state 9, the memory phase counter 614 counts back to state 0, allowing other inquiry messages to be formed at the typewriter units 100–0 through 100–7. After the typewriter unit 100–7 has printed out the reply character contained in the output character register 504, the output character timing circuit 602 again forms a control signal at the 602 output circuit. After the memory phase counter 614 enters state 0, it is again set into memory phase B. Thus, the next character of the reply message in sequence contained in the buffer output section of the memory 302 is read out, stored in the output character register 504 and subsequently typed out by the typewriter unit 100–7.

This sequence of operation continues until each of the characters of the reply message stored in the buffer output section of the memory 302 has been printed out by the typewriter unit 100–7. When the end of reply message character is read out and stored in the information register 304, the detector circuit 646 detects such character and applies a control signal to the gating circuit 648. The gating circuit 648 is also receiving a control signal from the PC11 output circuit of a program counter 652. Thus, the gating circuit 648 in turn applies a control signal to the delay circuit 650. Responsive thereto, the delay circuit 650 forms a control signal at its output circuit after a delay of sufficient length to allow the end of reply character to be printed out by the typewriter unit 100–7. The control signal formed at the output circuit of the delay circuit 650 causes the gate 653 to trigger the program counter 652 back to state 0 and resets the ODFF flip-flop into state zero.

It should be noted that from the time the end of inquiry message was formed by the typewriter unit 100–7 until the end of reply message character was typed out by the typewriter unit 100–7, the ODFF flip-flop is in a one state. The one state of the ODFF flip-flop causes the control signal to be removed from the ODF′ input to the gate 606 (FIG. 2B). Thus, even though an operator at one of the other typewriter units forms an end of inquiry message, the gate 606 does not apply a control signal to the gate 706, hence the designation of typewriter unit 100–7 by the output designate register 702 is unchanged. Thus, the control signal formed by the delay circuit 650 retriggers the ODFF flip-flop into a zero state allowing the output designate register 702 to be reset with a designation of another typewriter unit forming an end of inquiry message character.

What is claimed is:

1. In an inquiry system adapted to be coupled to a receiving device, the combination comprising:

(a) a plurality of typewriter units arranged for independently forming inquiry messages composed of a series of characters for a receiving device;

(b) at least one buffer storage device for temporarily storing messages being transferred between the typewriter units and such receiving device including a separate buffer portion for each typewriter unit having a predetermined storage location for storing the address of the next storage location in the corresponding buffer portion into which an inquiry character is to be stored;

(c) means for sequentially scanning and detecting the typewriter units forming an inquiry character and for forming a designation thereof and of a corresponding buffer portion;

(d) means under control of the designation for coupling the character provided by the detected typewriter unit to the buffer device;

(e) means under control of the designation for reading out the next address contained in the designated buffer portion from the buffer device;

(f) means under control of the designation and the next address read out of the buffer device for storing the inquiry character coupled to the buffer device into the storage location of the buffer portion designated thereby; and (g) means for incrementing the next address read out of the buffer device and for storing the incremented address back into the same predetermined storage location of the designated buffer portion.

2. In an inquiry system adapted to be coupled to a receiving device, the combination comprising:

(a) a plurality of inquiry devices arranged for forming inquiry messages composed of a series of characters for a receiving device;

(b) at least one buffer storage device for storing messages being transferred between the inquiry devices and such receiving device including a separate buffer portion for each inquiry device having a predetermined storage location for storing an address;

(c) means for sequentially scanning and detecting the inquiry devices forming an inquiry character and for forming a designation thereof and of a corresponding buffer portion;

(d) means under control of said designation for coupling the character provided by the detected inquiry device to the buffer device;

(e) means under control of said designation for reading the address contained in the designated buffer portion; and (f) means under control of said designation and said read address for storing the inquiry character coupled to the buffer device into the storage location of the designated buffer portion corresponding to the address read out of the buffer device.

3. In an inquiry system adapted to be coupled to a receiving device, the combination comprising:

(a) a plurality of inquiry devices arranged for forming inquiry messages composed of a series of signals for a receiving device;

(b) at least one buffer storage device for storing messages being transferred between the inquiry devices and such receiving device including a separate buffer portion for each inquiry device having a predetermined storage location for storing an address;

(c) means for monitoring the inquiry devices and for detecting the ones forming an inquiry signal and for forming a designation thereof and of a corresponding buffer portion;

(d) means under control of said designation for coupling the signal provided by the detected inquiry device to the buffer device;

(e) means under control of said designation for reading the address contained in the designated buffer section; and (f) means responsive to said designation and said read address for storing the inquiry signal coupled to the buffer device into a storage location of the designated buffer portion corresponding to the address read out of the buffer device.

4. In an inquiry system adapted to be coupled to a receiving device, the combination comprising:

(a) means having a plurality of output circuits at each of which a message composed of a series of signals is applied for a receiving device;

(b) buffer means for storing messages being transferred between the message forming means and such receiving device including a separate buffer storage area for each output circuit having a stored address;

(c) means for sequentially scanning and detecting the output circuits receiving a message signal and for forming a designation thereof and of a corresponding buffer storage area;

(d) means under control of said designation for coupling the signal received by the detected output circuit to the buffer means;

(e) means under control of said designation for reading the address out of the designated buffer storage area; and (f) means under control of said designation and said read address for storing the message signal coupled to the buffer means into a storage location of the designated buffer storage area corresponding to the address read out of the buffer means.

5. In an inquiry system adapted to be coupled to a receiving device, the combination comprising:

(a) means having a plurality of first output circuits at each of which a message composed of a series of signals is applied including a second output circuit for each first output circuit at which a ready signal is applied in coincidence with each signal of such series of signals;

(b) buffer means for storing messages being transferred between the message forming means and such receiving device including a separate buffer storage area for each output circuit having a stored address;

(c) means for sequentially scanning the second output circuits and for detecting a ready signal applied thereat and for forming a designation thereof and of a corresponding buffer storage area;

(d) means under control of said designation for coupling the corresponding message signal to the buffer means;

(e) means under control of said designation for reading the address out of the designated buffer section; and (f) means under control of said designation and said read address for storing the message signal coupled to the buffer means into a storage location of the designated buffer storage area corresponding to the address read out of the buffer means.

6. In a typewriter inquiry system for providing a series of independently formed message character signals from a plurality of typewriter units to a digital computer, the combination comprising:

(a) a scanning device having a plurality of input circuits each for receiving a series of applied message characters from a typewriter unit, the scanning device being arranged for sequentially scanning the input circuits and for forming a designation of the ones receiving a character;

(b) at least one buffer storage device for temporarily storing characters being sent to a digital computer including a separate buffer portion for each of said input circuits, each buffer portion having a predetermined storage location for storing the address of the next storage location in the buffer portion into which a character is to be stored;

(c) means under control of said designation for reading out of the buffer device the next address contained in the buffer portion corresponding to an input circuit receiving an applied character;

(d) means under control of said designation and of said read address for storing a character applied to the corresponding input circuit into the storage location designated by the next address read out of the buffer device in the buffer portion corresponding to the input circuit receiving the applied character; and (e) means for modifying the next address read out of the buffer device and for forming the address of the next storage location in order for storage of a character and for storing the modified address back into the predetermined storage location of the same buffer portion from which it was read.

7. In an inquiry system for providing a series of independently formed message character signals from a plurality of inquiry units to a digital computer, the combination comprising:

(a) means having a plurality of input circuits each for receiving a series of applied message characters from an inquiry unit, and means for sequentially scanning the input circuits and for forming a designation of the ones receiving a character;

(b) buffer means for temporarily storing characters being sent to a digital computer including a separate buffer portion for each of said input circuits, each buffer portion having a predetermined storage location for storing an address in the corresponding buffer portion;

(c) means under control of said designation for reading the address out of the buffer device contained in the buffer portion corresponding to the input circuit receiving an applied character;

(d) means under control of said designation and of said read address for storing a character applied to the corresponding input circuit into a storage location corresponding to the address read out of the buffer means in the buffer portion corresponding to the input circuit receiving the applied character; and (e) means for modifying the address read out of the buffer device and for storing the modified address back into the predetermined storage location of the same buffer portion from which it was read.

8. In an inquiry system, the combination comprising:

(a) a digital computer for receiving inquiry messages and forming reply messages thereto, the messages being composed of a series of characters;

(b) a plurality of independently operable typewriter devices arranged for forming a series of electrical character signals representing an inquiry message for the computer;

(c) buffer storage means including a separate buffer storage portion for each typewriter device;

(d) means for scanning the typewriter devices and forming electrical signals designating the scanned devices and a corresponding buffer portion in a preselected order and for detecting a typewriter device forming an electrical inquiry character including means for temporarily locking the scanning device in a condition forming an electrical signal corresponding to such detected typewriter device;

(e) a selection device under control of said electrical signals formed by said scanning device for coupling the character formed by the corresponding typewriter device to said buffer storage means;

(f) means under control of said electrical signals formed by said scanning device for storing the characters coupled by said selection device into sequential storage locations of the buffer portions designated by the electrical signals from said scanning device; and (g) means for reading the inquiry messages out of the buffer portions for the computer.

9. In an inquiry system, the combination comprising:

(a) a digital computer for receiving inquiry messages and forming reply messages thereto, the messages being composed of a series of characters;

(b) a plurality of independently operable typewriter devices arranged for forming a series of electrical character signals representing an inquiry message for the computer;

(c) buffer storage means including a separate buffer portion for each typewriter device;

(d) means including a counting device for counting through states in a preselected order designating the individual typewriter devices and corresponding storage portions in the buffer means, including means for temporarily locking the counting device in a condition indicative of each typewriter device forming an inquiry character;

(e) a selection circuit under control of the state of the counting device for coupling the character formed by the indicated typewriter device to the buffer means;

(f) means under control of the state of the counting device for storing the characters coupled by the selection circuit, into the buffer portion designated by the counting device in a locked condition; and (g) means for reading the inquiry messages out of the buffer sections for the computer.

10. In an inquiry system as defined in claim 9 wherein each buffer portion includes a predetermined storage location for storing an address in the corresponding buffer portion, the system additionally including:

(a) means under control of the state of the counting device for reading out the address contained in the buffer portion designated by the counting device in a locked condition, the storing means being arranged for storing the character coupled by the selection circuit, into a storage location corresponding to said next address and into the buffer portion designated by the counting device; and (b) means for modifying the address read out of the buffer device and including means for storing the modified address back into the predetermined storage location of the buffer portion designated by the counting device.

11. In an inquiry system, the combination comprising:

(a) a digital computer for receiving inquiry messages and for forming reply messages thereto, the messages being composed of a series of characters;

(b) a plurality of typewriter devices each arranged for forming a series of electrical character signals representing an inquiry message for the computer, and arranged for receiving a reply message and printing out the characters thereof for visual observation;

(c) buffer storage means including a separate buffer portion for each typewriter device;

(d) means including a counting device for scanning the typewriter devices in a preselected order and including means for detecting a typewriter device forming an electrical inquiry character and for temporarily locking the scanning device with the counting device in a state corresponding to such typewriter device and a corresponding buffer portion;

(e) means under control of the counting device state for storing the character from the corresponding typewriter device into the corresponding buffer section;

(f) output designating means arranged for detecting the last character of a complete inquiry message stored into a portion of the buffer storage means for storing an indication of the typewriter device forming such character;

(g) means for reading out a complete inquiry message for the computer and means for storing a reply message from the computer into said buffer means;

(h) means for reading a reply message out of the buffer means; and (i) selection means for coupling the characters of a reply message read out of the buffer means back to the typewriter device indicated by said output designating means.

12. In an inquiry system, the combination comprising:

(a) a reply device for receiving inquiry messages and for forming reply messages thereto, the messages being composed of a series of characters;

(b) a plurality of inquiry devices each arranged for forming a series of electrical character signals representing an inquiry message for the reply device, and arranged for receiving a reply message;

(c) buffer storage means including a separate buffer portion for each inquiry device;

(d) means including a counting device for scanning the inquiry devices in a preselected order and including means for detecting an inquiry device forming an electrical inquiry character and for temporarily locking the scanning device with the counting device in a state corresponding to such inquiry device and a buffer portion;

(e) means for storing the character from the corresponding inquiry device into the buffer portion corresponding to the state of the counting device in a locked condition;

(f) output designating means for detecting the last character of a complete inquiry message stored into a buffer section and including means for storing an indication of the inquiry device forming such character;

(g) means for reading a complete inquiry message out of a buffer portion and for storing a reply message thereto into said buffer means;

(h) means for reading a reply message out of the buffer means; and (i) selection means for coupling the characters of a reply message read out of the buffer means back to the inquiry device indicated by said output designating means.

13. In an inquiry system, the combination comprising:

(a) a digital computer for receiving inquiry messages and for forming reply messages thereto, the messages being composed of a series of characters;

(b) a plurality of typewriter devices each arranged for forming a series of electrical character signals representing an inquiry message for the computer, and arranged for receiving a reply message and printing out the characters thereof for visual observation, each typewriter device including means for forming a ready signal for each inquiry character formed thereby;

(c) buffer storage means including a separate buffer portion for each typewriter device;

(d) counting means for counting through a sequence of states corresponding to each of the typewriter devices and a corresponding buffer portion responsive to count signals;

(e) means for comparing the typewriter devices forming ready signals with the counting means and means for applying count signals to the counting means in the absence of equality therebetween;

(f) means coupled to be responsive to the detection of equality by the comparing means for storing the character formed by the typewriter device into the buffer portion corresponding to the state of the counting means;

(g) output designating means including means for detecting the last character of a complete inquiry message stored into a buffer portion and means for storing an indication of the typewriter device forming such character;

(h) means for reading a complete inquiry message out of a buffer section for the computer and means for storing a reply message from the computer into said buffer means;

(i) means for reading a reply message out of the buffer means; and (j) selection means for coupling the characters of a reply message read out of the buffer means back to the typewriter device indicated by said output designating means.

14. In an inquiry system as defined in claim 13 wherein each buffer means comprises:

(a) a predetermined storage location in each buffer portion for storing the address of a storage location in the corresponding buffer section;

(b) means for reading the address out of the buffer portion corresponding to the state of the counting means concurrently with the detection of equality by said comparing means, said character storing means including means for storing a character into a storage location of the buffer portion corresponding to the state of the counting means which corresponds to the address read out of such buffer portion; and (c) means for modifying the address read out of the buffer device and for storing the modified address back into the predetermined storage location of the buffer portion corresponding to the state of the counting means.

15. In an inquiry system, the combination comprising:

(a) a reply device for receiving inquiry messages and for forming reply messages thereto, the messages being composed of a series of characters;

(b) a plurality of inquiry devices each arranged for forming a series of characters repesenting an inquiry message for the reply device and for receiving a reply message thereto, each reply device including means for forming a ready signal for each inquiry character formed thereby;

(c) buffer storage means including a separate buffer portion for each inquiry device;

(d) counting means for counting through a sequence of states corresponding to each of the inquiry devices and a corresponding buffer portion responsive to count signals;

(e) means for comparing the inquiry devices forming ready signals with the counting means including means for applying count signals to the counting means in the absence of equality therebetween;

(f) means coupled to be responsive to the detection of equality by the comparing means for storing the character formed by the inquiry device into the buffer portion corresponding to the state of the counting means;

(g) output designating means including means for detecting the last character of a complete inquiry message stored into a buffer portion and means for storing an indication of the inquiry device forming such character;

(h) means for reading a complete inquiry message out of a buffer portion for the reply device and means for storing a reply message from the reply device into said buffer means;

(i) means for reading a reply message out of the buffer means; and (j) selection means for coupling the characters of a reply message read out of the buffer means back to the inquiry device indicated by said output designating means.

16. In an inquiry subsystem, the combination comprising:

(a) means having a plurality of output circuits each for providing a message composed of a series of signals;

(b) means including a separate buffer storage portion for each output circuit having a stored address;

(c) means for detecting an output circuit receiving a message signal and for forming a designation thereof and of a corresponding buffer storage section;

(d) means under control of said designation for coupling the signal from the detected output circuit to the buffer means;

(e) means under control of said designation for reading the address out of the designated buffer portion; and (f) means under control of said designation and said read address for storing the coupled message signal into a storage location of the designated buffer section corresponding to the address read out of the buffer means.

17. In an inquiry system in which a plurality of input devices provide messages to a computer the combination comprising:

(a) buffer means for storing messages being transferred between a plurality of input means and a receiving device including a separate buffer storage area for each input device having a stored address;

(b) means for sequentially scanning and detecting the input means providing a message and for forming a designation thereof and of a corresponding buffer storage area;

(c) means under control of said designation for coupling the message provided by the detected input means to the buffer means;

(d) means under control of said designation for reading the address out of the designated buffer storage area; and (e) means under control of said designation and said read address for storing the message character coupled to the buffer means into a storage location of the designated buffer storage area corresponding to the address read out of the buffer means.

18. In an inquiry subsystem for sending messages between message forming means comprising:

(a) a plurality of input circuits for receiving messages;

(b) buffer means having a separate buffer portion for each of said input circuits including an address stored in each one;

(c) means for monitoring said input circuits and for forming a designation of an input circuit to receive a message and of the corresponding buffer portion;

(d) selection means under control of said designation for coupling the message received at the corresponding input circuit to said buffer means;

(e) a register for storing a signal corresponding to said designation;

(f) means under control of said stored signal for reading out the address stored in the corresponding buffer portion; and (g) means under control of said stored signal for storing a message signal in the buffer location specified by said read address and in the buffer portion specified by said stored signal.

References Cited by the Examiner

UNITED STATES PATENTS

| | | | |
|---|---|---|---|
| 3,029,414 | 4/1962 | Schrimpf | 340—172.5 |
| 3,061,192 | 10/1962 | Terzian | 235—157 |
| 3,181,124 | 4/1965 | Hammel | 340—172.5 |
| 3,200,380 | 8/1965 | MacDonald et al. | 340—172.5 |

ROBERT C. BAILEY, *Primary Examiner.*

I. S. KAVRUKOV, *Assistant Examiner.*

UNITED STATES PATENT OFFICE

CERTIFICATE OF CORRECTION

Patent No. 3,305,839 February 21, 1967

Floyd W. Looschen et al.

It is hereby certified that error appears in the above numbered patent requiring correction and that the said Letters Patent should read as corrected below.

Column 6, line 73, for "te" read -- the --; line 73, for "EOMIFF" read -- EOMIF --; column 18, line 21, for "plus" read -- pulse --; line 59, for "MOpl" read -- MPOl --; column 21, line 11, strike out "equal".

Signed and sealed this 26th day of September 1967.

(SEAL)
Attest:

ERNEST W. SWIDER
Attesting Officer

EDWARD J. BRENNER
Commissioner of Patents